(12) United States Patent
Cao et al.

(10) Patent No.: US 7,913,304 B2
(45) Date of Patent: Mar. 22, 2011

(54) EVENT DETECTION METHOD AND DEVICE

(75) Inventors: Bin Cao, Shenyang (CN); Yong Wang, Shenyang (CN)

(73) Assignee: Neusoft Corporation, Shenyang (CN)

( * ) Notice: Subject to any disclaimer, the term of this patent is extended or adjusted under 35 U.S.C. 154(b) by 968 days.

(21) Appl. No.: 11/753,716

(22) Filed: May 25, 2007

(65) Prior Publication Data

US 2008/0052780 A1 Feb. 28, 2008

Related U.S. Application Data

(63) Continuation-in-part of application No. 11/691,155, filed on Mar. 26, 2007.

(30) Foreign Application Priority Data

Mar. 24, 2006 (CN) .......................... 2006 1 0046168

(51) Int. Cl.
*G06F 12/14* (2006.01)

(52) U.S. Cl. ......................................................... 726/23

(58) Field of Classification Search ...................... 726/23
See application file for complete search history.

(56) References Cited

U.S. PATENT DOCUMENTS

| | | | |
|---|---|---|---|
| 5,105,353 A * | 4/1992 | Charles et al. ................ | 717/143 |
| 7,546,234 B1 * | 6/2009 | Deb et al. ........................... | 704/9 |
| 2003/0036900 A1 * | 2/2003 | Weise ............................ | 704/9 |
| 2003/0084344 A1 * | 5/2003 | Tarquini et al. ............... | 713/201 |
| 2005/0216770 A1 * | 9/2005 | Rowett et al. ................. | 713/201 |
| 2006/0253273 A1 * | 11/2006 | Feldman et al. .................. | 704/9 |
| 2006/0259508 A1 * | 11/2006 | Sikdar et al. .................. | 707/102 |
| 2007/0220063 A1 * | 9/2007 | O'Farrell et al. ............. | 707/201 |

OTHER PUBLICATIONS

Roesch M., "Snort—Lightweight Intrusion Detection for Networks", *The USENIX Association, Proceedings of LISA '99: 13th Systems Administration Conference*: 229-238 (1999).

(Continued)

*Primary Examiner* — Nasser Moazzami
*Assistant Examiner* — Michael S McNally
(74) *Attorney, Agent, or Firm* — Scully, Scott, Murphy & Presser, P.C.

(57) ABSTRACT

The embodiments of the present invention disclose an event detection method and device. The method includes: predefining event-based detection rules with a predicative context-free grammar; generating by parsing the detection rules a parsing table of pushdown automaton which supports parallel parsing; receiving an event to be detected; and analyzing by a controller the event to be detected according to the parsing table, to obtain a detection result. The present invention is especially applicable to detection of network attack events. The embodiments of the present invention detect the attacks with a predicative context-free grammar on the basis of events, and ensure a close combination of a protocol parsing process and an attack detection process, as well as a close combination of multiple attack detection rules, thus decreasing unnecessary calculations. In addition, with an optimized parallel pushdown automaton, the embodiments of the present invention can efficiently analyze the predicative context-free grammar. Consequently, besides hierarchical processing capability and state description capability, the embodiments of the present invention deliver high efficiency.

12 Claims, 6 Drawing Sheets

OTHER PUBLICATIONS

Kumar S. et al., "A Pattern Matching Model for Misuse Intrusion Detection", *National Institute of Standards and Technology/National Computer Security Center, 17th National Computer Security Conference*: 11-21 (1994).

Lee W. et al., "Automated Intrusion Detection Using NFR: Methods and Experiences" *USENIX Association, Proceedings of the Workshop on Intrusion Deteection and Network Monitoring (ID '99)*: 62-72 (1999).

Paxson V. "Bro: a system for detecting network intruders in real-time" *Computer Networks 31*: 2435-2463 (1999).

Eckmann S. T. et al., "STATL: An attack language for state-based intrusion detection" *Journal of Computer Security 10*: 71-103 (2002).

Cuppens F. et al., "LAMBDA: A Language to Model a Database for Detection of Attacks" *Springer-Verlag Berlin Heidelberg*: 197-216 (2000).

Michel C. et al., Edited by Dupuy M et al., "ADELE: An Attack Description Language for Knowledge Based Intrusion Detection" *Trusted Information, The New Decade Challenge, Kluwer Academic Publishers*: 353-368 (2001).

Pouzol J-P et al., "From Declarative Signatures to Misuse IDS" *Springer-Verlag Berlin Heidelberg*: 1-21 (2001).

Sekar R. et al., "A High-Performance Network Intrusion Detection System" ACM: 8-17 (1999).

\* cited by examiner

EVENT DETECTION METHOD AND DEVICE

CROSS-REFERENCE TO RELATED APPLICATIONS

This application is a continuation-in-part of U.S. application Ser. No. 11/691,155, filed Mar. 26, 2007, which claims priority of Chinese Application No. 200610046168.1 filed on Mar. 24, 2006, entitled "Multi-event Network Attack Detection Method" which application is incorporated by reference herein in its entirety.

FIELD OF THE INVENTION

The present invention relates to event-based data packet detection technologies, and particularly to an event detection method and device, which are especially applicable to network intrusion detection field.

BACKGROUND OF THE INVENTION

The development of intrusion technologies has brought great difficulties to intrusion detection. Traditional string matching based network intrusion detection systems, such as Snort (see document 1: Snort: Lightweight Intrusion Detection for Networks, M Roesch—LISA, 1999) can judge attacks merely on the basis of whether there is a certain signature in an single intercepted network data packet or whether certain ports are opened, but are unable to check the attacks veritably as a process, and therefore result in high false negative rate and false positive rate.

Depending on methods that can be used to detect attacks, Sandeep Kumar classified the attacks into categories of "existence", "sequence", and "partial order" (see document 2: S. Kumar and E. H. Spafford. A Pattern Matching Model for Misuse Intrusion Detection. In Proc. of the 17th National Computer Security Conference, 1994). "Existence" category refers to: once a certain event is found, it may be determined that an attack occurs. "Sequence" category refers to: it is determined that an attack occurs only when a series of events happen in a certain order, and detection for that category of attack requires storing variables for subsequent determination. "Partial order" category is wider than "sequence" category, and it doesn't requires a series of events happen in a certain order to identify an attack; a typical example is: when event A and event B happen before event C does, regardless of the order in which event A and event B happen, the events meet "partial order" relationship.

That puts forward requirements regarding methodology for designers of intrusion detection and prevention systems, that is, the detection model to be used must be capable of sufficiently and concisely expressing various attacks characterized by "existence", "sequence", and "partial order", and, on that basis, efficiently identifying attacks.

To attain that goal, people have first tried to utilize variables to store states, and, based on that concept, adapted some procedural languages, for example, NFR's N-Code (see document 3: W. Lee, C. Park and S. Stolfo, Automated Intrusion Detection using NFR: Methods and Experiences, USENIX Intrusion Detection Workshop, 1999), SecureNet Pro's SNP-L, and open source software Bro developed by V. Paxson (see document 4: V. Paxson, Bro: A System for Detecting Network Intruders in Real-Time, USENIX Security Symposium, 1998), to perform state-based detection. In those systems, attack rules are written in procedural statement and variables are utilizes to store states, which requires a rule developer to have profound knowledge on the language execution mechanism. For a small system, it is not a problem; however, for a large-scale intrusion detection system in which protocol-level detection modules and attack rules have to be developed by several, several tens of, or even hundreds of programmers, it is quite difficult to require every programmer to have in-depth understanding on the internal execution mechanism of the detection language. That barrier results in poor expandability and maintainability of such systems.

To solve the above problem, people attempt to perform state-based intrusion detection with description languages, such as state transition language STATL (see document 5: S. T. Eckmann, G. Vigna, and R. A. Kemmerer. STATL: An Attack Language for State-based Intrusion Detection. In Proc. of ACM Workshop on Intrusion Detection, Athens, Greece, November 2000), Lambda (see document 6: F. Cuppens and R. Ortalo. LAMBDA: A Language to Model a Database for Detection of Attacks. In Proc. of RAID'00, LNCS vol. 1907, Springer, 2000), AdeLe (see document 7: C. Michel and L. M'e. ADeLe: an Attack Description Language for Knowledge-based Intrusion Detection. In Proc. of the 16th International Conference on Information Security, 2001), IDIOT developed by S. Kumar (see document 2), etc. However, the development in such languages requires defining explicitly "States" and "Transitions" in a reasoning process. This means that rule developers have to manually define an automaton for detection, which is too difficult for ordinary developers, however. Accordingly those languages are not genuine description languages.

Different from the above quasi-description languages, the Sutekh language developed by Pouzol (see document 8: Jean-Philippe Pouzol, Mireille Ducass é: From Declarative Signatures to Misuse IDS, RAID 2001) and the REE language developed by R. Sekar (see document 9: A High-Performance Network Intrusion Detection System, R Sekar, Y Guang, S Verma, T Shanbhag-ACM Conference on Computer and Communications Security, 1999) are genuine description languages. The two developers made valuable research in conversion of a state description rule to high-performance executable codes. However, both of the two languages are based on regular grammar and thereby have limited expression capability. In addition, due to the fact that the detection mechanism of regular grammar is finite automaton, the two languages have weak support for hierarchical processing capability required in protocol parsing.

SUMMARY OF THE INVENTION

To solve the above problems, the embodiments of the present invention provides an event detection method capable of describing protocols hierarchically, which is especially applicable for detecting multi-event network attacks. The method employs predicative context-free grammar and can accurately define existence, sequence and partial order attacks. The method also employs a parallel pushdown automaton-based detection algorithm and is applicable to analysis of complex applications. In addition, the method has high detection efficiency.

To attain the above object, according to an embodiment of the present invention, the following technical schemes are disclosed.

A event detection method includes predefining event-based detection rules with a predicative context-free grammar; generating by parsing the detection rules a parsing table of pushdown automaton which supports parallel parsing; receiving an event to be detected; and analyzing by a controller the event to be detected according to the parsing table, to obtain a detection result.

Preferably, the detection rules include protocol rules and attack rules when the method is applied to network intrusion detection field. The method may further includes: defining multiple protocol events on different layers with predicates, and defining the attack rules on the basis of atomic protocol events and/or abstracted protocol events.

Preferably, the detection analysis includes: buffering a matching state of a previous event to be detected; and analyzing a next event to be detected in the parsing table with reference to the matching state of the previous event to be detected, to obtain a latest matching state of the next event to be detected.

Preferably, the parsing table of pushdown automaton is obtained through the steps of: a) parsing the protocol rules and the attack rules to obtain a syntax tree; b) generating item sets of the predicative context-free grammar with a predicative LR(0) generation algorithm; c) converting the item sets to obtain a corresponding parsing table of pushdown automaton which includes an ACTION table and a GOTO table.

Preferably, the predefining of the protocol rules and the attack rules is performed through the steps of: on the basis of a protocol specification, adding a protocol terminal symbol $v_{tp}$ to the terminal symbol set $V_T$ with the predicative context-free grammar; adding an attack non-terminal symbol $v_{na}$ to the non-terminal symbol set $V_N$ with the predicative context-free grammar; and adding a production $r_a$ to the production set R, with the attack non-terminal symbol $v_{na}$ on a left-hand side of the production $r_a$ and at least one protocol terminal symbol $v_{tp}$, on a right-hand side of the production $r_n$.

Preferably, the protocol rules and the attack rules are predefined through the steps of: on the basis of a protocol specification, adding a protocol terminal symbol $v_{tp}$ to the terminal symbol set $V_T$ with the predicative context-free grammar; adding a protocol non-terminal symbol $v_{np}$ to the non-terminal symbol set $V_N$, wherein the protocol non-terminal symbol $v_{np}$ is obtained from a combination of the protocol terminal symbol $v_{tp}$ and a predicate; adding an attack non-terminal symbol $v_{na}$ to the non-terminal symbol set $V_N$ with the predicative context-free grammar; and adding a production $r_a$ to the production set R, with the attack non-terminal symbol $v_{na}$ on a left-hand side of the production $r_a$ and at least one protocol terminal symbol $v_{tp}$ or protocol non-terminal symbol $v_{np}$ on a right-hand side of the production $r_a$.

Preferably, the predicative LR(0) generation algorithm includes the steps of: a) generating an initial item set with a predicative item set closure algorithm; b) on the basis of the initial item set, generating neighbor item sets with a predicative neighbor item set generation algorithm; c) on the basis of the neighbor item sets, executing the predicative item set closure algorithm and the neighbor item set generation algorithm iteratively until no new item set is generated.

According to another embodiment of the present invention, an event detection device is disclosed. The event detection device includes: a storage module, adapted to store event-based detection rules, which are predefined in a predicative context-free grammar; a generation module, adapted to parse the detection rules and generate a corresponding parsing table of pushdown automaton, wherein the parsing table supports parallel parsing; an interface unit, adapted to receive events to be detected and output detection results; and an analysis module, adapted to perform a matching in the parsing table for the events to be detected, to obtain the detection results.

Preferably, the detection rules include protocol rules and attack rules when the detection device is applied to network intrusion detection field; the generation module includes: a parser, adapted to parse the protocol rules and the attack rules to obtain a syntax tree; a first converter, adapted to generate item sets of the predicative context-free grammar with a predicative LR(0) generation algorithm; a second converter, adapted to convert the item sets to obtain a corresponding parsing table of pushdown automaton which includes an ACTION table and a GOTO table.

Preferably, for an item set I, the neighbor item set generation algorithm includes: a) if both item A: $\lambda \cdot B$ (P1) $\beta$ and item C: $\beta \cdot B$ (P2) $\gamma$ belong to a closure function CLOSURE (I), generating two new item sets with item A: $\lambda$ B (P1)·$\beta$ and item C: $\beta B(P2) \cdot \gamma$ as kernels respectively, b) else if both item A: $\lambda \cdot B$ $\beta$ and item C: $\delta \cdot B$ (P2) $\gamma$ belong to the CLOSURE (I), generating two new item sets with item A: $\lambda \cdot B$ $\beta$ and item C: $\beta B(P2) \cdot \gamma$ as kernels respectively; c) else if both item A: $\lambda \cdot B$ $\beta$ and item C: $\delta \cdot B \gamma$ belong to the CLOSURE (I), generating a new item set with item A: $\lambda B \cdot \beta$ and item C: $\delta B \cdot \gamma$ as kernels; d) else if item A: $\lambda \cdot B$ (P1) $\beta$ belongs to the CLOSURE (I), generating a new item set with item A: $\lambda$ B (P1)·$\beta$ as a kernel; e) else if item A: $\lambda \cdot B$ $\beta$ belongs to the CLOSURE (I), generating a new item set with item A: $\lambda B \cdot \beta$ as a kernel.

Preferably, when the item set I includes multiple root item sets and there is an item in an root item set $I_j$ that is a noncongenetic item of the item set I, a neighbor item set generation algorithm to be applied to the root item set $I_j$ includes:

a) if both item A: $\lambda \cdot B$ (P1) $\beta$ and item C: $\delta \cdot B$ (P2) $\gamma$ belong to a closure function CLOSURE ($I_j$), generating two new item sets with item A: $\lambda$ B (P1)·$\beta$ and item C: $\delta$ B (P2)·$\gamma$ as kernels respectively;

b) else if both item A: $\lambda \cdot B$ $\beta$ and item C: $\delta \cdot B$ (P2) $\gamma$ belong to the CLOSURE ($I_j$), generating two new item sets with item A: $\lambda$ B·$\beta$ and item C: $\delta$ B (P2)·$\gamma$ as kernels respectively;

c) else if both item A: $\lambda \cdot B$ $\beta$ and item C: $\delta \cdot B \gamma$ belong to the CLOSURE ($I_j$) while reducible item B: $\sigma \cdot$ belongs to item set I, and furthermore, if item A: $\lambda \cdot B$ $\beta$ and item B: $\sigma \cdot$ are congenetic while item C: $\delta \cdot B \gamma$ and item B: $\sigma \cdot$ are not congenetic or item A: $\lambda \cdot B$ $\beta$ and item B: $\sigma \cdot$ are not congenetic while item C: $\delta \cdot B \gamma$ and item B: $\sigma \cdot$ are congenetic, generating two new item sets with item A: $\lambda B \cdot \beta$ and item C: $\delta B \cdot \gamma$ as kernels respectively; otherwise generating a new item set with item A: $\lambda B \cdot \beta$ and item C: $\delta B \cdot \gamma$ as kernels;

d) else if item A: $\lambda \cdot B$ (P1)·$\beta$ belongs to the CLOSURE ($I_j$), generating a new item set with item A: $\lambda$ B (P1)·$\beta$ as a kernel; and e) else if item A: $\lambda \cdot B$ $\beta$ belongs to the CLOSURE ($I_j$), generating a new item set with item A: $\lambda B \cdot \beta$ as a kernel.

Preferably, an algorithm of the controller includes the steps of:

a) if an input symbol is a terminal symbol, taking an parsing table entry from the ACTION table; if the input symbol is a non-terminal symbol, taking an parsing table entry from the GOTO table;

b) if the parsing table entry contains a Shift-Reduce (SR) conflict or a Reduce-Reduce (RR) conflict, copying a state stack so that each state stack has only one action, and then proceeding to step c);

c) if the parsing table entry is a reduction action $r_j$, reducing with a production j, subtracting pointers of the state stack and a symbol stack by m which is a number of events on a right-hand side of the production j, and then taking a non-terminal symbol on the right-hand side of the production j as an input symbol; if there is a merged state stack, splitting the merged state stack and then returning to step a); else if the parsing table entry is not a reduction action, proceeding to step d);

d) for an input symbol a, besides the symbol a with a corresponding parsing table entry as a Shift action $S_0$, if there is at least one predicative symbol, supposing which is $a(p_1), a(p_2), \ldots, a(p_k)$ with corresponding parsing table entries as Shift actions $S_1$, $S_2, \ldots, S_k$, checking whether predicates $p_1, p_2, \ldots, p_k$ are true; if at least one of the predicates is true, which means a Shift-Shift conflict occurs, copying the state stack, taking the symbol a and a symbol $a(p_i)$ which meets the predicate $p_i$ as input symbols, and then proceeding to step e); and if the parsing table entry corresponding to the symbol a is blank, and there are at least two predicative symbols, supposing which are $a(p_1)$, $a(p_2)$, ..., $a(p_k)$ with corresponding parsing table entries as Shift actions $S_1, S_2, \ldots, S_k$, checking whether predicates $p_1, p_2, \ldots, p_k$ are true; if at least two of the predicates are true, which means a Shift-Shift conflict occurs, copying the state stack, taking symbols $a(p_i)$ which meet the predicates $p_i$ as input symbols, and then proceeding to step e);

e) else if the parsing table entry is a Shift action $S_j$, shifting the input symbol into the symbol stack and state j into the state stack; if there is another state stack with the same stack top state j, merging them; furthermore, if a parsing table entry ACTION $[j]=r_i$, that is, the state j is a reducible state, performing a reduction with the production i; if there is a merged state stack, splitting the merged state stack; then returning to step a); if the state j is not a reducible state, terminating the process of the algorithm;

f) else if the parsing table entry is a successful action Succ, which means the grammar analysis is successful, terminating the process of the algorithm;

g) else if the parsing table entry is blank, proceeding to an error handling and terminating the process of the algorithm.

The embodiments of the present invention also provide a computer program product. The computer program product includes a computer readable media, wherein computer executable codes, which is adapted to execute the steps of the method according to any one of the above detection schemes or a combination thereof, are stored on the readable media.

Compared to the prior art, the present invention has the benefits as follows.

1. The embodiments of the present invention provide a new event detection method, which is especially applicable to detection of network attack events. The embodiments of the present invention take a concept of event instead of specific protocol commands and perform detection of attacks based on events. In that way, the development of the intrusion detection system is separated into three parts, which are accomplished by an event analysis engine developing team, a protocol analysis developing team, and an attack analysis developing team, respectively. Each team can expand the system continuously in its domain, without affecting other teams. Therefore, the expandability of the system is improved.

2. The embodiments of the present invention describe the attacks in a predicative context-free grammar, and thereby can describe the protocol hierarchy of a complex application. The embodiments of the present invention can describe "existence", "sequence" and "partial order" attacks, thus enhancing the description capacity against multi-event network attacks. The embodiments of the present invention can also define complex expressions and can describe constraint conditions for single-packet attacks and multi-packet attacks at any order of complexity.

3. The embodiments of the present invention can detect attacks efficiently. With the predicative context-free grammar, the grammar analysis system ensures a close combination of a protocol parsing process and an attack detection process, as well as a close combination of multiple attack detection rules, so that there is no redundant calculation in the system. In addition, with an optimized parallel pushdown automaton, the embodiments of the present invention can efficiently analyze the predicative context-free grammar. Consequently, besides hierarchical processing capability and state description capability, the embodiments of the present invention deliver high efficiency.

4. The embodiments of the present invention have high real-time performance. By parsing the predicative context-free grammar with a parallel pushdown automaton, the problem of delay in a conventional LR(k) algorithm is avoided, which enables the algorithm to be applied to intrusion prevention systems that have high requirement for real-time performance.

DETAILED DESCRIPTION OF THE EMBODIMENTS

Hereunder the present invention will be described in detail with reference to embodiments, in conjunction with die accompanying drawings.

In principle, the present invention is applicable to any event filtering system that can be customized quickly (e.g., a customized authentication agent), and especially applicable to network intrusion detection. Hereunder the present invention will be described with regard to network intrusion detection.

To solve the problem regarding poor expandability and maintainability of the aforementioned intrusion detection methods, in the embodiments of the present invention, a predicative context-free grammar is put forward, with which the system can operate with an event as a basic unit to be processed instead of a specific protocol command. In that way, the embodiments of the present invention can be applicable to a variety of protocols, without modification to the system according to the embodiments of the present invention. Therefore, in the embodiments of the present invention, attack detection and protocol parsing are partly or entirely organized in a grammar form, to construct a grammar analysis system. The process of the grammar analysis is a process of protocol parsing and attack detection.

However, such a grammar analysis system usually covers multi-layer protocol events and hundreds of attack rules and often involves some cases in which internal states can't be enumerates finitely, and therefore is non-regular. Therefore, in the embodiments of the present invention, a context-free grammar is employed to carry out protocol-based intrusion detection.

In another aspect, in order to define the non-state characteristic of attacks, in the embodiments of the present invention, predicates are introduced in the context-free grammar. By using the predicates, the characteristics of single-event network attacks, the relationship between multiple symbols in multi-event network attacks and the relationship between different event layers of a protocol can be defined, thus enabling the present invention a complete description capability.

The introduction of the predicates brings a Shift-Shift (SS) conflict. To solve the SS conflict problem, the aforementioned predicative context-free grammar generates a parsing table containing a Shift-Shift (SS) conflict, a Shift-Reduce (SR) conflicts and a Reduce-Reduce (RR) conflict, so that in the case that conflicts occur during the system operation, they are resolved dynamically.

The above run-time conflict resolution algorithm results in a "merge-delay" in some special cases. To this end, in the embodiments of the present invention, an improved PLR(0) item sets generation algorithm is introduced, in which the PLR(0) refers to a predicative LR(0) algorithm. Hereunder the embodiments of the present invention will be described mainly with respect to PLR(0) algorithm.

Figure 1:
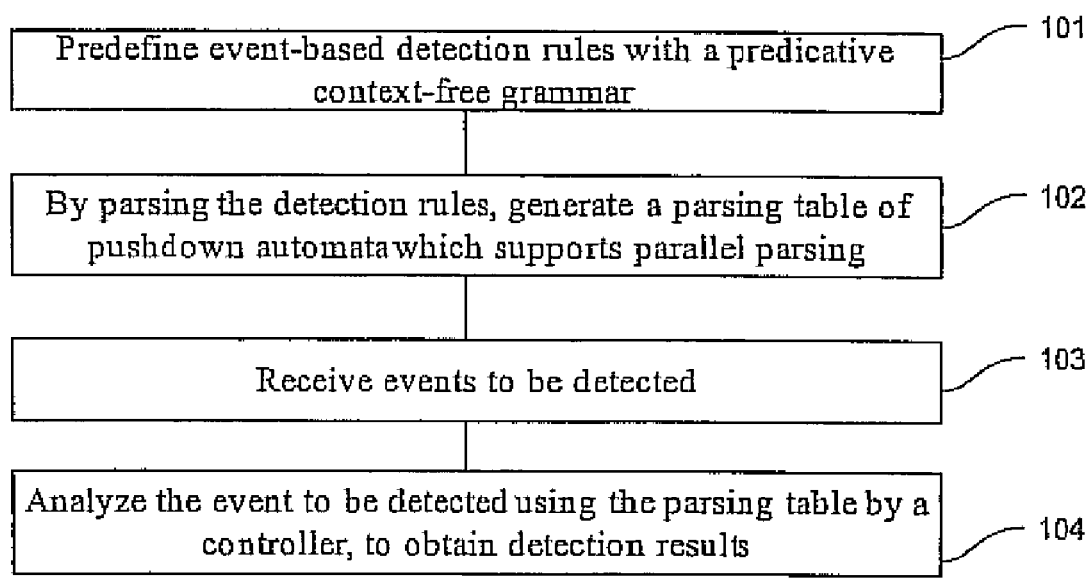
FIG. 1 illustrates a flow chart of an event detection method according to Embodiment 1 of the present invention.

FIG. 1 illustrates a flow chart of an event detection method according to Embodiment 1 of the present invention.

In Step 101, event-based detection rules are predefined with a predicative context-free grammar.

In Step 102, a parsing table of pushdown automaton which supports parallel parsing is created by parsing the detection rules.

In Step 103, events to be detected are received.

In Step 104, an analysis is made on the events with the parsing table by a controller, and detection results are obtained.

When the detection method shown in FIG. 1 is applied to network intrusion detection field, the detection rules include protocol rules and attack rules. The predefining process mainly includes: defining multiple protocol events on different layers with predicates, and defining attack rules on the basis of atomic protocol events or abstracted protocol events, that is, an attack is defined as a consecutive occurrence of one or more protocol symbols which meet certain predicates.

In the embodiment of the present invention, the predicative context-free grammar is employed to predefine the detection rules, thus excellently unifying the protocol parsing and the attack detection. The predicative context-free grammar G in the embodiment is a quintuple in the following form:

$G=\{V_N, V_T, S, R, P\}$.

In this quintuple, $V_T$ is a terminal symbol set including terminal symbols $v_t$; $V_N$ is a non-terminal symbol set including non-terminal symbols $v_n$; $V_T$ and $V_N$ are collectively referred to as symbol set V, and the symbols in the symbol set V are referred to as symbols v; S is a target grammar symbol, and $S \in V_N$; R is a production set of the grammar; and P is a predicate set of the grammar. A production is typically in the following form:

$v_n: v_1(p_1) \ldots , v_k(p_k)$.

The Left-Hand Side (LHS) of the production is a non-terminal symbol $v_n \in V_N$. The Right-Hand Side (RHS) of the production includes zero or more predicative terminal symbols or non-terminal symbols $v_1, \ldots , v_k \in V$, wherein predicates $p_1, \ldots , p_k \in P$. The predicates are constraints that should be met by the symbols on the right-hand side of the production, and each consists of a combination of logical operators, arithmetic operators and function calls. The semantics of the production is: the symbol on the left-hand side of the production is reduced from the predicative symbols on the right-hand side of the production.

Each of the predicates is usually a composite expression comprising of constants, variables and event variables, e.g., (data_len>=512). The return value of the expression may only be "True" or "False". In the case that the logic of the expression is complex, the expression may also be defined as a function, and then the predicate may be formed by means of a call of the function.

In this patent application, "events" are abstracts of various protocol commands, and correspond to "terminal symbols" and "non-terminal symbols" in the grammar, "Events" are classified into "atomic events" and "abstracted events". An "atomic event" corresponds to a specific "fact", e.g., a TCP datagram. An "abstracted event" is composed of one or several "atomic events", representing a logically independent collection of several atomic events.

In the field of protocol parsing and attack detection, a command is referred to as an event. However, in the field of grammar analysis, a command is referred to as a symbol. Usually, the correspondence between the event and the symbol may be as follows: "event"="symbol", "abstracted event"="non-terminal symbol" and "atomic event"="terminal symbol".

In general, the event-based detection rules can be predefined according to either of the two schemes.

Scheme 1

The protocol rules and attack rules are predefined through the steps of: on the basis of protocol specification, adding a protocol terminal symbol $v_{tp}$ into the terminal symbol set $V_T$ with the predicative context-free grammar; adding an attack non-terminal symbol $v_{na}$ into the non-terminal symbol set $V_N$ with the predicative context-free grammar; and adding a production $r_a$ into the production set R. In this way, what on the left-hand side of the production is the attack non-terminal symbol $v_{na}$, and what on the right-hand side of the production includes at least one protocol terminal symbol $v_{tp}$. Scheme 1 is usually applied to simple protocols.

Scheme 2

The protocol rules and attack rules are predefined through the steps of: on the basis of protocol specification, adding a protocol terminal symbol $v_{tp}$ into the terminal symbol set $V_T$ with the predicative context-free grammar; adding the protocol non-terminal symbol $v_{np}$ into the non-terminal symbol set $V_N$ with the predicative context-free grammar, wherein the protocol non-terminal symbol $v_{np}$ is obtained by combining the protocol terminal symbol $v_{tp}$ with a predicate; adding an attack non-terminal symbol $v_{na}$ into the non-terminal symbol set $V_N$ with the predicative context-free grammar; and adding a production $r_a$ into the production set R. In this way, what on the left-hand side of the production is the attack non-terminal symbol $v_{na}$ and what on the right-hand side of the production includes at least one protocol terminal symbol $v_{tp}$ or protocol non-terminal symbol $v_{np}$. Scheme 2 is usually applied to complex protocols.

It would be appreciated by those skilled in the art that the above two schemes may be combined in a variation of the present invention.

Embodiment 1

Hereunder the definition of protocol-based multi-event network attacks with the predicative context-free grammar will be described in an example of a specific attack grammar G1.

In the grammar G1, a terminal symbol set $V_T=\{t\}$, wherein a protocol terminal symbol t represents a raw tcp data packet; a non-terminal symbol set $V_N=\{REQ, ACK, ANY, RA, RAS, ATK, ALL\}$, wherein the protocol non-terminal symbol REQ represents a request data packet meeting a predicate P1, the protocol non-terminal symbol ACK represents a response data packet meeting a predicate P2, the protocol non-terminal symbol RA represents a request-response pair, the protocol non-terminal symbol RAS represents one or more request-response pair, and the target grammar symbol ALL is an analysis target of the grammar G1. A production set R of the grammar G01 includes:

REQ: t(P1)

ACK: t(P2)

ANY:

|t|ANY t

ATK: ANY REQ (P3) ACK (P4)

RA: REQ ACK

RAS: RA|RAS

ALL: RAS|ATK

The attack non-terminal symbol ATK represents an attack which is composed of a sequential occurrence of a protocol non-terminal symbol ANY, a protocol non-terminal symbol REQ meeting a predicate P3 and a protocol non-terminal symbol ACK meeting a predicate P4. The protocol non-terminal symbol ANY represents zero or any number of protocol terminal symbols t, which means that before the protocol non-terminal symbol REQ meeting the predicate P3 is found, there may be any number of protocol terminal symbol t passing through in the current session.

To describe the stack copy process of the PLR(0) parsing algorithm, besides the attack non-terminal symbol ATK, the protocol non-terminal symbol RAS is also to be detected. Therefore, the grammar target symbol ALL is defined as resolved from the attack non-terminal symbol ATK or the protocol non-terminal symbol RAS.

There may be an empty production (which means a production with an empty right-hand side) in the above attack detection grammar G1. For an empty production ANY:, a non-terminal symbol ANY' can be introduced to replace the non-terminal symbol ANY which may be empty. The non-terminal symbol ANY' is in the same definition as the non-terminal symbol ANY, except that it can't be empty, as shown below:

ANY': t

|ANY't

And if the following production exists:

A: λANY β the production may be replaced as:

A: λβ

A: λANY'β

It is obvious that the above conversion is complete equivalent. Therefore, in the embodiment of the present invention, there is no need to consider an empty event in run time, and the parsing algorithm is simplified.

Usually, in the predicative context-free grammar G, there may be some productions with a right-hand side as a target grammar symbol S. When the target grammar symbol S occurs in the analysis process, an extended target grammar symbol S' and a production are added in order to determine whether the target grammar symbol S represents a successful analysis or the symbol on the right-hand side of a production.

The added production is shown as:

S': S

In this way, an extended grammar G' is formed from the grammar G. In this example, an extended grammar target symbol ALL' is added, and a new production is added accordingly:

ALL': ALL

Through the above two conversions, the extended grammar G1' is obtained from the original context-free grammar G1, and each production is numbered in sequence:

| | |
|---|---|
| REQ:t(P1) | (1) |
| ACK:t(P2) | (2) |
| ANY':t | (3) |
| ANY':ANY t | (4) |
| ATK:REQCP3)ACK(P4) | (5) |
| ATK:ANY'REQ(P3)ACK(P4) | (6) |
| RA:REQ ACK | (7) |
| RAS:RA | (8) |
| RAS:RAS RA | (9) |
| ALL:RAS | (10) |
| ALL':ALL | (11) |
| ALL':ALL | (12) |

The extended grammar G1' completely expresses the above multi-event network attack detection specification. However, network events can't be detected merely with that grammar, and it is necessary to construct a parsing table for an analyzer, which is a parallel pushdown automaton, of the extended grammar G1'. After then, actual detections may be carried out with that parsing table.

For the Step 102, the parsing table of pushdown automaton that supports parallel parsing can be obtained through steps as follows.

a) The protocol rules and attack rules are parsed to obtain a syntax tree.

b) The item sets of the predicative context-free grammar are generated with the predicative LR(0) generation algorithm.

c) The item sets are converted to obtain a corresponding parsing table of pushdown automaton which includes an ACTION table and a GOTO table.

It is noted that for the above parsing table generation process, the predefined protocol rules and attack rules can be parsed and converted to obtain a corresponding parsing table of parallel pushdown automaton by using the above steps in the process whenever the system according to the embodiments of the present invention starts up. Then, the table can be utilized to carry out a matching and analysis. Of course, in the detection case that the protocol rules and attack rules are fixed relatively, the parsing table obtained through the above steps may be stored in a file, in other words, when the protocol rules and attack rules are not changed, a parsing table generated in advance can be used to carry out the matching and analysis. A new parsing table is required only when the protocol rules and attack rules are updated. Therefore, the efficiency is improved.

Preferably, the predicative LR(0) generation algorithm can include: a) generating an initial item set with a predicative item set closure algorithm; b) on the basis of the initial item set, generating neighbor item sets with a predicative neighbor item set generation algorithm; c) on the basis of the neighbor item sets, executing the predicative item set closure algorithm and the neighbor item set generation algorithm iteratively until no new item set is generated.

The parsing table of parallel pushdown automaton (including an ACTION table and an GOTO table) is generated on the basis of the item sets of the predicative context-free grammar. The item sets of the predicative context-free grammar is generated with the PLR(0) generation algorithm. The PLR(0) generation algorithm is obtained by adding treatment for the predicate part on the basis of the LR(0) generation algorithm and includes two sub-algorithms: a predicative item set closure algorithm and a neighbor item set generation algorithm. The closure algorithm is used to generate the initial item set $I_0$; then, the neighbor item set generation algorithm is invoked to generate the neighbor item set; next, the above algorithms are used for the neighbor item set iteratively until no new item set is generated; finally, the generated item sets are converted into a parsing table.

The LR(k) generation algorithm invented by Donald E. Knuth is an algorithm for constructing item sets to recognize a context-free grammar (see document 10: Principles of Compiler, by L U Yingzi, ZHANG Suqin and JIANG Weidu, Beijing, Tsinghua University Press, 1998.1). The context-free grammar that can be identified by the LR(k) algorithm is called an LR(k) grammar, which is a subset of the context-free grammar The LR(k) grammar is enough to satisfy the requirements of most computer programming languages.

However, the LR(k) generation algorithm is not applicable to construct the pushdown automaton for the predicative context-free grammar for the reasons as follows: 1) a grammar composed of protocols and attacks often creates severe conflicts, so that a large pre-read window k ($k \geq 2$) is required to eliminate die conflicts, thereby resulting in an extremely complex algorithm; 2) even if the pre-read window k is not too large, the current packet has to be detected with reference to the next event as long as the pre-read window k>0, thus causing a processing delay.

To solve that problem, in an embodiment of the present invention, a parallel pushdown automaton is utilized as a recognizer, so that the system can analyze any predicative context-free grammar without delay.

To explain the predicative item set closure algorithm and the neighbor item set generation algorithm, here the concepts of item and item set in the LR(0) algorithm are introduced first.

In order to indicate how many of the symbols on the right-hand side of every production have been parsed in the analysis process of the context-free grammar, the LR(0) algorithm employs the concept of item. An item is a production with a dot which is used for indicating a matching position. Hereunder several item examples will be described.

Item A: $\cdot \lambda \beta$ indicates that there has not been a symbol string $\lambda \beta$ at symbol stack top yet and now a symbol string corresponding to $\lambda \beta$ is expected.

Item A: $\lambda \cdot \beta$ indicates that the substring $\lambda$ on the right-hand side of a production A: $\lambda \beta$ has appeared at symbol stack top, and a symbol string corresponding to the symbol string $\beta$ is expected to be seen in the input string. If the symbol String $\beta$ is a terminal symbol, such an item is called a Shift item.

Item A: $\lambda \beta \cdot$ indicates that the symbol string $\lambda \beta$ on the right-hand side of a production A: $\lambda \beta$ has appeared at symbol stack top completely. Such an item is called a Reduce item.

Due to the fact that an input character may meet multiple productions at the same time, an item set includes one or more items to indicate the case that one or more productions make progress in their matching contexts. The item sets of the predicative context-free grammar are obtained by taking such an item set as a node and a symbol as a transition.

The predicative item set closure algorithm according to the embodiment of the present invention is also implemented by constructing an item set. At an early stage in the construction of an item set the item set only includes one or several kernel items. Subsequently, a entire item set is constructed with a closure function CLOURSE (I) in a recursive manner.

The algorithm for the function CLOSURE (I) in the embodiment of the present invention includes steps as follows.

a) All the items in item set I are in the closure function CLOSURE (I).

b) If item A: $\lambda \cdot B(P) \beta$ belongs to the function CLOSURE (I), every item similar to B: $\cdot \gamma$ belongs to the closure function CLOSURE (I).

c) If item A: $\lambda \cdot B \beta$ belongs to the closure function CLOSURE (I), every item similar to B: $\cdot \gamma$ belongs to the closure function CLOSURE (I).

d) Steps b) or c) is repeated until no new item is generated.

If S is a target grammar symbol of a predicative context-free grammar G, a production S': S is added to form an extended grammar G' of the grammar G First, item set S': $\cdot$S is added to an initial item set $I_0$, and then the closure function CLOSURE ($I_0$) for the initial item set $I_0$ is determined thus generating a new $I_0$.

After the initial item set $I_0$ is generated with the function CLOSURE (I), neighbor item sets are generated with the neighbor item set generation algorithm according to the embodiment of the present invention. For any item set $I_i$, the neighbor item sets that can be resulted from every acceptable symbol are determined, and then are subjected to a closure operation. The process is repeated until no new item set is generated.

For the item set I, the process for determining a neighbor item set thereof according to the embodiment of the present invention is as follows.

a) If both item A: $\lambda \cdot B$ (P1) $\beta$ and item C: $\delta \cdot B$ (P2) $\gamma$ belong to CLOSURE (I), two new item sets are generated with item A: $\lambda B$ (P1)$\cdot \beta$ and item C: $\delta$ B (P2)$\cdot \gamma$ as kernels respectively.

b) Else if both item A: $\lambda \cdot B \beta$ and item C: $\delta \cdot B$ (P2) $\gamma$ belong to CLOSURE (I), two new item sets are generated with item A: $\lambda$ B$\cdot \beta$ and item C: $\delta$ B P2) $\gamma$ as kernels respectively.

c) Else if both item A: $\lambda \cdot B \beta$ and item C: $\delta \cdot B \gamma$ belong to CLOSURE (I), two new item sets are generated with item A: $\lambda$ B$\cdot \beta$ and item C: $\delta$ B$\cdot \gamma$ as kernels respectively.

d) Else if item A: $\lambda \cdot B$ (P1) $\beta$ belongs to CLOSURE (I), anew item set is generated with item A: $\lambda$ B (P1)$\cdot \beta$ as the kernel.

e) Else if item A: $\lambda \cdot B \beta$ belongs to CLOSURE (I), a new item set is generated with item A: $\lambda$ B$\cdot \beta$ as the kernel.

Figure 2:
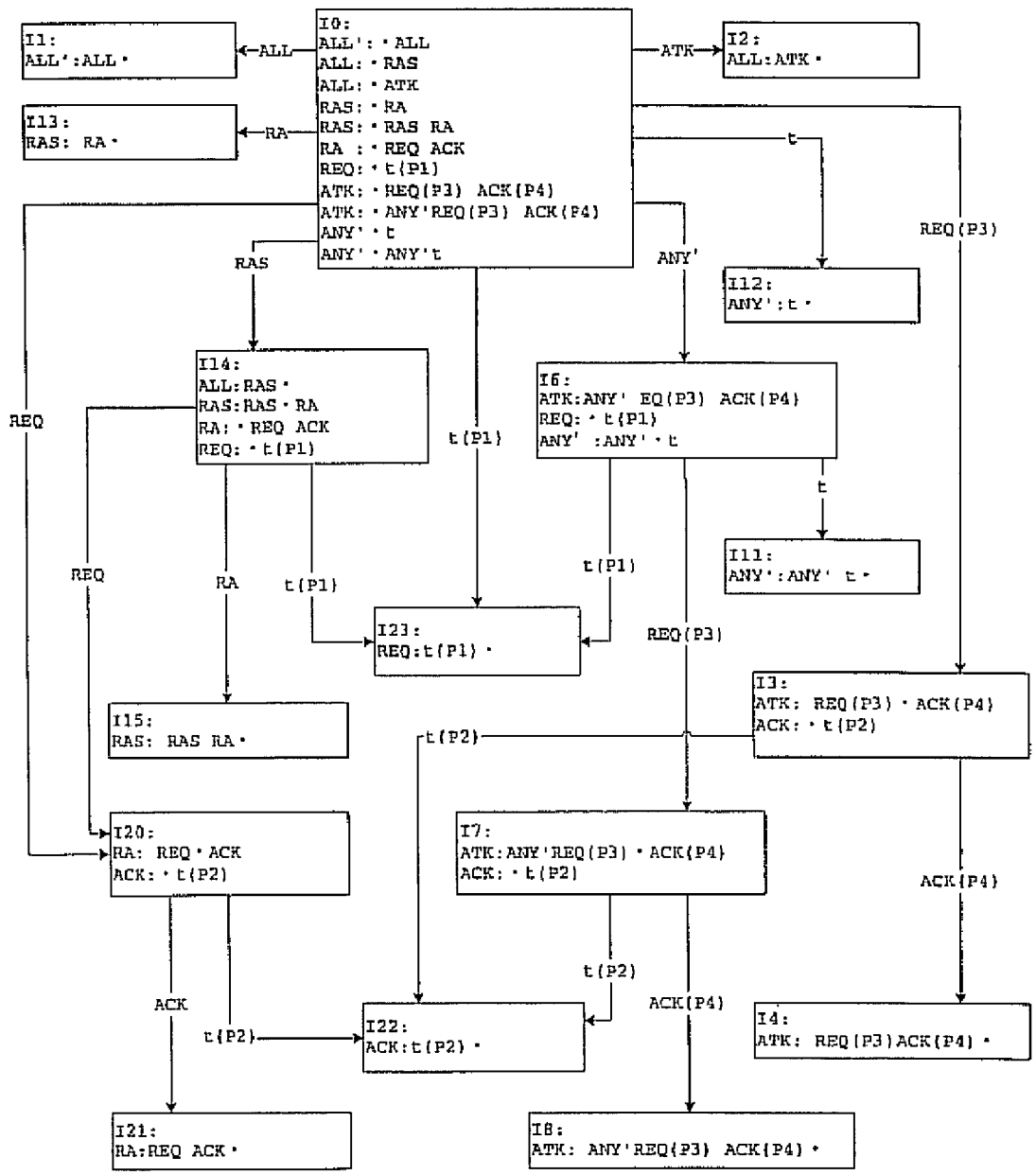
FIG. 2 illustrates a constitution diagram of item sets according to an embodiment of the present invention.

Then the item sets that recognize the extended grammar G1' are generated with the item set generation algorithm (see FIG. 2). The symbols in the item sets are the symbols in the aforementioned extended grammar G1'. Each box corresponds to an item set. Neighbor item sets are connected with a line on which an acceptable symbol is labeled.

If there are two types of conflicting actions in the same item set, such a grammar is called a conflicting context-free grammar. There are two types of conflicts in the generation process of the LR(0) item set as follows.

One is Shift-Reduce (SR) conflict. For this type of conflict, if item A: $\lambda \cdot a \beta$ and item B: $\gamma \cdot$ exist in the same item set at the same time, for the input symbol a, it is unable to determine whether to shift the symbol a or reduce the symbol string γ to the symbol B.

The other is Reduce-Reduce (RR) conflict. For this type of conflict, if item A: λ· and item B: γ· exist in the same item set at the same time, for any input symbol, it is unable to determine whether to reduce the symbol string λ to the symbol A or reduce the symbol string γ to the symbol B.

The predicative context-free grammar G has also Shift-Shift (SS) conflict in addition to the above two conflicts.

For the Shift-Shift (SS) conflict, if item A: λ·B(P1) β and item B: δ·B(P2) γ exist in the same item set at the same time, in the run time, for the input symbol B, if both P1 and P2 are true at the same time, the Shift-Shift (SS) conflict occurs. The SS conflict is caused by the introduction of predicates, and thus also called predicate conflict or classification conflict. The SS conflict can occur only in run time.

In order to resolve the SR conflict and the RR conflict, the LR(k) algorithm employs a technique that can determine how to treat the current symbol only by check forward k events, wherein k>0. That causes a processing delay.

However, in the field of intrusion detection, especially in the field of intrusion prevention, an algorithm with delay will result in the case that an attack has already happened when an intrusion prevention system determines the attack occurs, which is unacceptable for an intrusion prevention system.

To solve that problem, in an embodiment of the present invention, a run-time conflict resolution method is employed. In such a method, a parsing table with SS conflict is generated during the generation process of the parsing table by treating symbol B(P1) and symbol B(P2) as two different symbols. At a state s in ma time, for the input symbol B, if both P1 and P2 are true at the same time, the state stack will be split. In this way, the miss of any possible match may be avoided.

In the embodiment of the present invention, in addition to the SS conflict the SR conflict and the RR conflict are also resolved in run time. As a result, the system can detect all attacks that can be defined in a context-free grammar.

Then, an ACTION table and a GOTO table are constructed according to the item sets of the predicative context-free grammar G The ACTION table logs each action upon the receipt of a terminal symbol for each state, and the GOTO table logs each action upon the receipt of a non-terminal symbol for each state. The construction process is described as follows.

Supposing the generated item sets C={$I_0, I_1, \ldots, I_n$}, the suffix k of each item set $I_k$ is configured as a state of the controller, so the parsing table of the predicative context-free grammar a has states 0, 1, . . . , n. The item set containing item S': ·S is configured as $I_0$, and then the ACTION table and the GOTO table can be constructed through the method as follows.

a) If item A: λ·a(P) β belongs to item set $I_k$ and the process goes to an item set $I_j$ after the terminal symbol a(P) is recognized, an action table entry ACTION [k, a(P)] is set as shift action $S_j$, indicating to shift the state j into the state stack and shift the symbol a(P) into the symbol stack.

b) If item A: λ· belongs to item set $I_k$, for any terminal symbol a and terminal event #, an action table entry ACTION [k, a] is set as a reduction action $r_j$, which may be described in short as that an action table entry ACTON [k, a] is set as $r_j$. Here, j is a serial number of A: λ in the extended grammar G'. The reduction action $r_j$ indicates to reduce the symbol string λ at the top of the current symbol stack to A, and move down a stack pointer from the stack top by a length of the symbol string λ, and then push the symbol A into the stack (which is equivalent to perform a reduction with the production A: λ).

c) If item A: λ·A(P) β belongs to item set $I_k$ and the process goes to the item set $I_j$ after the non-terminal symbol A(P) is recognized, GOTO[k,A(P)] is set as a shift action j, indicating to shift the symbol A(P) into the symbol stack and shift the state j into the state stack when the input symbol is A(P) in the case of a current state k.

d) If item S': S belongs to $I_k$, the action table entry ACTION [k] is set as success acc, indicating an acceptance.

e) Entries that can't be filled according to the above rules a)-d) are kept blank in the parsing table.

Different from the LR(0) generation algorithm, conflicts are permitted in the embodiments of the present invention (that is, the action table entries can be {$S_i, r_j$} or {$r_i, r_j$}) since a stack copy method is employed to resolve the conflicts in run time.

Referring to Table 1, the ACTION table and the GOTO table for the aforementioned extended grammar G1' are constructed.

TABLE 1

ACTION table and GOTO table for extended grammar G1'

| State | ACTION | | | | GOTO | | | | | | | | |
|---|---|---|---|---|---|---|---|---|---|---|---|---|---|
| | t | t(P1) | t(P2) | # | REQ | REQ(P3) | ACK | ACK(P4) | ANY' | ATK | RA | RAS | ALL |
| 0 | S12 | S23 | | | 20 | 3 | | | 6 | 2 | 13 | 14 | 1 |
| 1 | | | | Succ | | | | | | | | | |
| 2 | | R11 | | | | | | | | | | | |
| 3 | | | S22 | | | | | 4 | | | | | |
| 4 | | | R5 | | | | | | | | | | |
| 6 | S11 | S23 | | | | 7 | | | | | | | |
| 7 | | | S22 | | | | | 8 | | | | | |
| 8 | | | R6 | | | | | | | | | | |
| 11 | | | R4 | | | | | | | | | | |
| 12 | | | R3 | | | | | | | | | | |
| 13 | | | R8 | | | | | | | | | | |
| 14 | R10 | R10 | R10 | R10 | 20 | | | | | | | 15 | |
| | | S23 | | | | | | | | | | | |
| 15 | | | R9 | | | | | | | | | | |
| 20 | | | S22 | | | | 21 | | | | | | |
| 21 | | | R7 | | | | | | | | | | |
| 22 | | | R2 | | | | | | | | | | |
| 23 | | | R1 | | | | | | | | | | |

It should be noted that, in state 0 and state 6, either a non-terminal symbol t or a terminal symbol t(P1) may be accepted. This means that, in order to attain all matches in run time, once the input symbol is the non-terminal symbol t and the predicate P1 is true, the state stack must be copied. And then, the non-terminal symbol t and the non-terminal symbol t(P1) must be shifted into two state stacks so as to correspond to different productions respectively.

Figure 3:
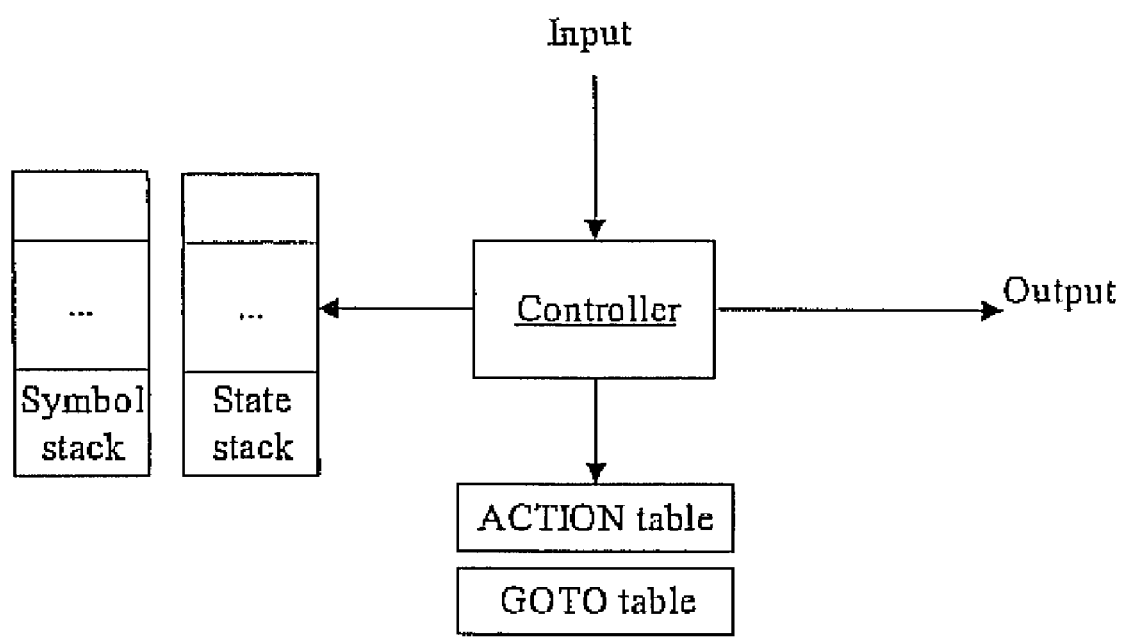
FIG. 3 illustrates a constitution diagram of a parallel pushdown automaton according to an embodiment of the present invention.

For the Step 104, the multi-event network attack is analyzed according to the generated parsing table. The PLR(0) parsing algorithm is based on an LR(0) parsing algorithm, and includes a parsing table, a state stack and a symbol stack, as well as a controller, as shown in FIG. 3. The state stack is adapted to keep state information. The symbol stack is adapted to keep semantic information. The controller is adapted to search in the parsing table for an appropriate action according to a current input symbol and the state at the top of the state stack and then take a corresponding operation on the state stack and the symbol stack.

The PLR(0) algorithm in the embodiment of the present invention includes a PLR(0) generation algorithm and the PLR(0) parsing algorithm. The algorithm of the controller are determined by the PLR(0) parsing algorithm.

Since in the embodiments of the present invention, protocol events at different layers are defined with predicates and attack rules are defined on the basis of atomic protocol events or abstracted protocol events, a state-based detection may be carried out, which includes the steps of: buffering a matching state of the previous event to be detected; and, carrying out an analysis in the parsing table for the next event to be detected with reference to the matching state of the previous event to be detected, to obtain a latest matching state of the next event to be detected.

The operations supported by the controller in the embodiment of the present invention include "Copy", "Shift", "Merge", "Reduce", "Split", "Succ" and "Error".

For the Copy, when the stack top state indicates that the controller corresponds to multiple actions, which means that the current state stack can't meet the requirement of analysis, the state stack has to be copied.

For the Shift when the stack top state indicates that the analyzer requires another event to continue the analysis and there is an acceptable input symbol at that time, the input symbol is pushed into the symbol stack.

For the Merge, if stack top states of multiple state stacks are identical to each other, one of the state stacks can be used to perform the analysis representing other state stacks. The Merge has an advantage of reducing redundant calculations.

For the Reduce, if the content in the state stack is a state sequence w and there is a production A: w, this means that the state sequence w in the stack can be cleared and then the A can be taken as an input symbol.

For the Split, after accomplishing the analysis on behalf of multiple state stacks, the representative stack returns an obtained symbol to the represented stack stacks, and thus the representation relationship is terminated.

For the Succ, which is a special case of Reduce, a sequence w composed of all the states in a stack is reduced to an extended target grammar symbol S'. This means the analysis is successful. For example, if (S': ATK; S': RAS) is defined, the occurrence of an ATK will lead to a "Succ", and the occurrence of a RAS (protocol non-terminal symbol) will also lead to a "Succ".

For the Error, when a current input symbol can't enable the grammar to continue, the controller reports an error.

Figure 4:
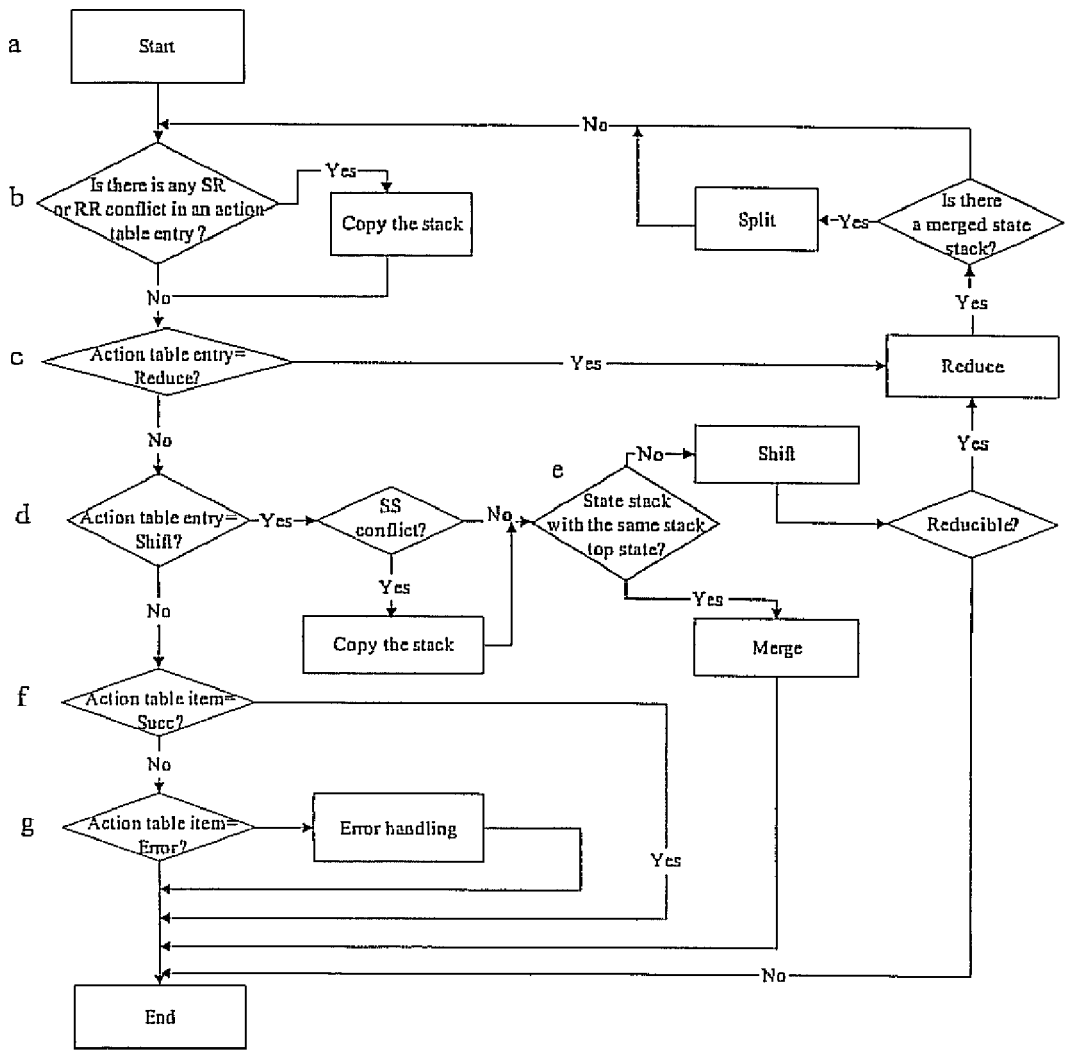
FIG. 4 illustrates a flow chart of logical steps of a controller according to an embodiment of the present invention.

The controller according to an embodiment of the present invention employs the following algorithm, the process including which steps runs iteratively until the system recognizes the extended target grammar symbol S'. The algorithm is described as follows (see FIG. 4).

a) If the input symbol is a terminal symbol, a parsing table entry is taken from the ACTION table. If the input symbol is a non-terminal symbol, a parsing table entry is taken from the GOTO table.

b) If the parsing table entry contains a Shift-Reduce (SR) conflict or a Reduce-Reduce (RR) conflict, that is, multiple actions exist in a state s, it is only required to copy the state stack so that each state stack has only one action, and then the process goes to step c).

c) If the parsing table entry is a reduction action $r_j$, without checking forward another character, a reduction is performed with the production j, the pointers of the two stacks each are subtracted by m (the number of events on the right-hand side of the production j), and then the non-terminal symbol on the right-hand side of the production j is taken as an input symbol. If there is a merged state stack, the merged state stack is split, and then the process returns to step a).

d) Else, for input symbol A:

1) besides the symbol a with a corresponding parsing table entry as Shift action $S_0$, if there is at least one predicative symbol, supposing which is $a(p_1), a(p_2), \ldots, a(p_k)$ with corresponding parsing table entries as Shift actions $S_1, S_2, \ldots, S_k$, whether predicates $p_1, p_2, \ldots, p_k$ are true is checked. If at least one of the predicates is true, which means a Shift-Shift (SS) conflict occurs, the state stack is copied, and the symbol a and the symbol $a(p_i)$ that meets the predicate $p_i$ are taken as the input symbols. Then the process goes to step e);

2) if the parsing table entry corresponding to the symbol a is blank, and there are at least two of the symbols, supposing which are $a(p_1), a(p_2), \ldots, a(p_k)$ with corresponding parsing table entries as Shift actions $S_1, S_2, \ldots, S_k$, whether predicates $p_1, p_2, \ldots, p_k$ are true is checked. If at least two of the predicates are true, which means a Shift-Shift (SS) conflict occurs, the state stack is copied, and symbols $a(p_i)$ which meet the predicates $p_i$ are taken as the input symbols. Then the process goes to step e).

e) Else if the parsing table entry is a Shift action $r_j$, the input symbol is shifted into the symbol stack and the state j is shifted into the state stack. If there is another state stack with the same stack top state j, the two state stacks are merged. If parsing table entry ACTION [j]=$r_i$, that is, the state j is a reducible state, a reduction is performed with the production i. If there is a merged the state, a split is performed on the stack. Then the process returns to step a). If the state j is not a reducible state, the algorithm process terminates.

f) Else if the parsing table entry is a successful action Succ, which means the grammar analysis is successful, the algorithm process terminates.

g) Else if the parsing table entry is blank, the algorithm process goes to the error handling and terminates.

In order to decrease the cost regarding stack copy in the PLR(0) parsing algorithm, only stack is copied but the symbol stack is not copied in a parallel parsing process, the resulting state stack shares the symbol stack with the original state stack, and a reference counter is employed to maintain the release of events.

For the aforementioned parsing table constructed according to extended grammar G1', if the actual input is t, and P1 and P2 are true, t(P1) and t(P2) are reduced to obtain REQ and ACK respectively; if P3 and P4 are also true, REQ(P3) and ATC(P4) are obtained. The parallel matching process of the controller is as follows (see Table 2).

TABLE 2

Parallel matching process of extended grammar G1'

| Step | Input event | State stack | | Action | ACTION | GOTO |
|---|---|---|---|---|---|---|
| 1 | T(P1) | 0 | | Shift | S23 | |
| 2 | | 0 | 23 | Reduce REQ: t(P1) | | |
| 3 | REQ | 0 | | Shift | | 20 |
| | REQ(P3) | 0 | | Shift | | 3 |
| 4 | t(P2) | 0 | 20 | Shift | S22 | |
| | t(P2) | 0 | 3 | Shift | S22 | |
| 5 | | 0 | 20 22 | Reduce ACK: t(P2) | | |
| | | 0 | 3 4 | Reduce ACK: t(P2) | | |
| 6 | ACK | 0 | 20 | Shift | | 21 |
| | ACK(P4) | 0 | 3 | Shift | | 4 |
| 7 | | 0 | 20 21 | Reduce RA: REQ ACK | | |
| | | 0 | 3 4 | Reduce ATK: REQ(P3) ACK(P4) | | |
| 8 | RA | 0 | | Shift | | 13 |
| | ATK | 0 | | Shift | | 2 |
| 9 | | 0 | 13 | Reduce RAS: RA | | |
| | | 0 | 2 | Reduce ALL: ATK | | |
| 10 | RAS | 0 | | Shift | | 14 |
| | ALL | 0 | | Shift | | 1 |
| 11 | | 0 | 14 | Reduce ALL: RAS | | |
| | | 0 | 1 | Succ | | |
| 12 | ALL | 0 | | Shift | | 1 |
| 13 | | 0 | 1 | Succ | | |

Figure 5:
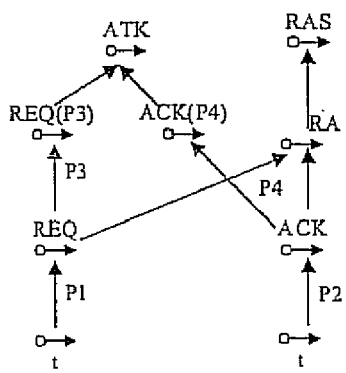
FIG. 5 illustrates a schematic diagram of a derivation tree according to an embodiment of the present invention.

The derivation tree shown in FIG. 5 illustrates the deriving process of the extended grammar G1' intuitively. The symbols in the derivation tree are the symbols of the aforementioned extended grammar G1'. Each node in the derivation tree is reduced from one or more sub-nodes in a lower layer next to it; the reduction relationship is denoted by a line with arrow, with a predicate labeled beside the line.

It is seen from FIG. 5 that requirements for the detection of an attack non-terminal symbol ATK and the analysis of a protocol non-terminal symbol RAS may be met simultaneously after the analysis for a protocol non-terminal symbol REQ and a protocol non-terminal symbol ACK is carried out in only one cycle. In the case that the detection of the attack non-terminal symbol ATK and the analysis of the protocol non-terminal symbol RAS can't be carried out in the same stack at the same time (Step 3 in Table 2), the controller will split the state stack into multiple state stacks, so that the detection of the ATK and the analysis of the RAS can be carried out in parallel. It indicates that the PLR(0) parsing algorithm is capable of carrying out protocol-based detection for multi-event network attacks and ensuring a minimum system overhead in the detection process.

Due to employing the parallel pushdown automaton to analysis the predicative context-free grammar, the system needn't to check forward a symbol to resolve conflicts. As a result the analysis method according to the embodiment of the present invention can be applied even in an intrusion prevention system.

Embodiment 2

The embodiment 2 is different from the embodiment 1 in that for a simple protocol, firstly, it is enough to define a protocol terminal symbol $v_{tp}$ without defining a protocol non-terminal symbol $v_{np}$; then an attack non-terminal symbol $v_{na}$, is defined; finally a production $r_a$, is defined, with the attack non-terminal symbol $v_{na}$ on the left-hand side of the production, and one or more predicative protocol terminal symbols $v_{tp}$ on the right-hand side of the production.

Embodiment 3

The embodiment 3 is different from the embodiment 1 in that, for a conflict-free grammar, the predicative context-free grammar generates a parsing table without SS conflict, SR conflict and RR conflict with the PLR(0) generation algorithm; the controller searches in the parsing table according to the current input event and the stack top state of the state stack and thereby determines the action to be taken; however, since there is no SS conflict, SR conflict or RR conflict in the parsing table, the state stack will not be copied, and the controller will only include "Shift", "Reduce", "Succ" and "Error" actions.

Embodiment 4

In some cases, the aforementioned PLR(0) parsing algorithm may result in a merge-delay. Hereunder how the merge-delay occurs will be described by an example of specific attack grammar G2'.

In a grammar G2, a terminal symbol set $V_T=\{p, s, e, d\}$, and a non-terminal symbol set $V_N$=any, ANY, P, A, D, S). A target grammar symbol S is an analysis target of the grammar G2. The serially numbered extended production set R of the grammar G2 includes:

| | |
|---|---|
| any:p | (1) |
| any:s | (2) |
| any:e | (3) |
| any:d | (4) |
| ANY':any | (5) |
| ANY':ANY'any | (6) |
| P:pse | (7) |
| P:pA | (8) |
| A:sDe | (9) |
| D:d | (10) |
| S:P | (11) |
| S:ANY'A | (12) |
| S':S | (13) |

Figure 6:
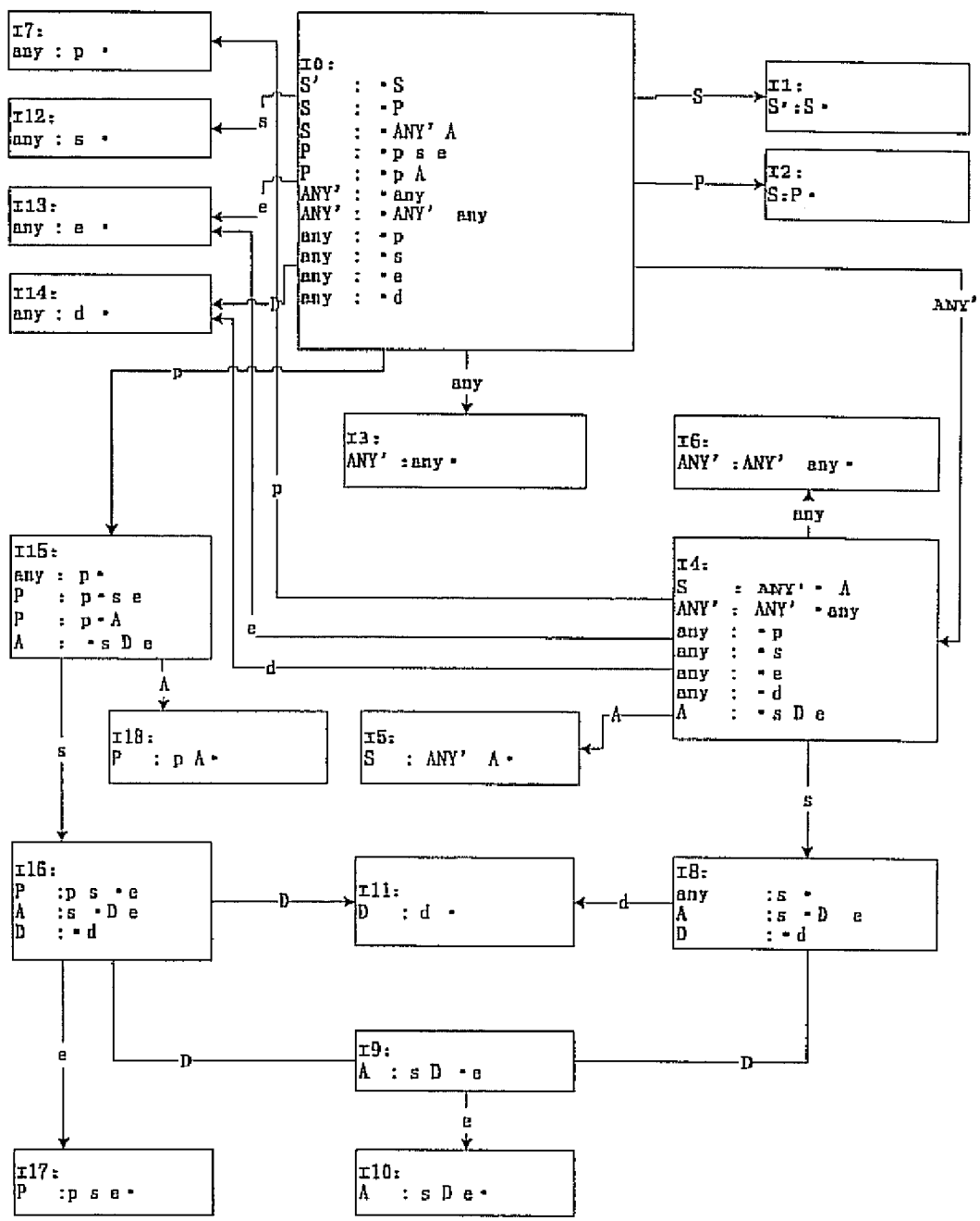
FIG. 6 illustrates a constitution diagram of item sets according to another embodiment of the present invention.

Item sets of the extended grammar G2' (see FIG. 6) and a parsing table (omitted) are generated with the item set generation algorithm of predicative context-free grammar. Supposing an actual input is p, s, d, and e, a parallel matching process of the controller is described as follows (see Table 3).

items generated with the aforementioned predicative item set closure algorithm and the neighbor item set generation algorithm, the two items are called congenetic items.

b) For congenetic items in form of A: λ·B β and B: σ·, item A: λ·B β is referred to as a root item of item B: σ·. If an item

TABLE 3

Parallel matching process of extended grammar G2'

| Step | Input event | State stack | | | | Action | ACTION | GOTO |
|---|---|---|---|---|---|---|---|---|
| 1 | p | 0 | | | | Shift | S15 | |
| 2 | | 0 | 15 | | | Reduce any: p | | |
| 3 | any | 0 | 15 | | | Shift | | 3 |
| | | 0 | | | | | | |
| 4 | | 0 | 15 | | | Reduce ANY': any | | |
| | | 0 | 3 | | | | | |
| 5 | ANY' | 0 | 15 | | | Shift | | 4 |
| | | 0 | | | | | | |
| 6 | | 0 | 15 | | | | | |
| | | 0 | 4 | | | | | |
| 7 | s | 0 | 15 | | | Shift | S16 | |
| | s | 0 | 4 | | | Shift | S8 | |
| 8 | | 0 | 15 | 16 | | Reduce any: s | | |
| | | 0 | 4 | 8 | | | | |
| | | 0 | 4 | 8 | | | | |
| 9 | any | 0 | 15 | 16 | | | | 6 |
| | | 0 | 4 | 8 | | | | |
| | | 0 | 4 | | | | | |
| 10 | any | 0 | 15 | 16 | | Reduce ANY': ANY' any | | |
| | | 0 | 4 | 8 | | | | |
| | | 0 | 4 | 6 | | | | |
| 11 | ANY' | 0 | 15 | 16 | | Shift | | 4 |
| | | 0 | 4 | 8 | | | | |
| | | 0 | | | | | | |
| 12 | | 0 | 15 | 16 | | | | |
| | | 0 | 4 | 8 | | | | |
| | | 0 | 4 | | | | | |
| 13 | d | 0 | 15 | 16 | | Shift | S11 | |
| | d | 0 | 4 | 8 | | Shift | S11 | |
| | d | 0 | 4 | | | Shift | S14 | |
| 14 | | 0 | 15 | 16 | 11 | Reduce D: d | | |
| | | 0 | 4 | 8 | ↱ | | | |
| | | 0 | 4 | 14 | | Reduce any: d | | |
| 15 | D | 0 | 15 | 16 | | Shift | | 9 |
| | D | 0 | 4 | 8 | | Shift | | 9 |
| | any | 0 | 4 | | | Shift | | 6 |
| 16 | | 0 | 15 | 16 | 9 | Reduce ANY': ANY' any | | |
| | | 0 | 4 | 8 | ↱ | | | |
| | | 0 | 4 | 6 | | | | |
| 17 | ANY' | 0 | 15 | 16 | 9 | Shift | | 4 |
| | | 0 | 4 | 8 | ↱ | | | |
| | | 0 | | | | | | |
| 18 | | 0 | 15 | 16 | 9 | | | |
| | | 0 | 4 | 8 | ↱ | | | |
| | | 0 | 4 | | | | | |
| 19 | e | 0 | 15 | 16 | 9 | Shift | S10 | |
| | | 0 | 4 | 8 | ↱ | | | |
| | e | 0 | 4 | | | | S13 | |
| 20 | | 0 | 15 | 16 | 9 | 10 Reduce A: sDe | | |
| | | 0 | 4 | 8 | ↱ | | | |
| | | 0 | 4 | 13 | | Reduce any: e | | |
| 21 | A | 0 | 15 | | | Shift | | 18 |
| | | 0 | 4 | 8 | ↱ | | | |
| | any | 0 | 4 | | | Shift | | 6 |

In the driving process 20 shown in Table 3, since the state 9 of the first state stack is the representation state second state stack, the second state stack becomes a defunct stack when the first state stack consumes 3 states in performing a reduction.

To further discuss that issue, the following two concepts are introduced into the embodiment of the invention.

a) During the process in which the PLR(0) generation algorithm is used, if there is a generation path between two set I contains an item similar to B: σ·, any item set R containing item A: λ·B β or item A: λ·B (P) β is a root item set of item set I.

Further study shows that the root cause for the merge-delay problem is that in item set 15 and item set 4 (which are root item sets for item set 10), there are not only congenetic items of A: s D e but also other noncongenetic items; the existence of those noncongenetic items causes reducible item sets unable to be merged at the right time, and results in the occurrence of the defunct stack.

In order to solve the merge-delay problem, if a certain reducible item set I has two or more root item sets in the item set generation process, a set of root item sets $\Sigma(I)=\{I_1, \ldots, I_n\}$ for the reducible item set I may be determined. For each root item set $I_j$, if there are some items in the $I_j$ and those items are noncongenetic items of the reducible item set I, all sub-item sets of $I_j$ are regenerated along an original reasoning path and starting from $I_j$, and an improved neighbor item set generation algorithm is used.

The improved neighbor item set generation algorithm is described as follows.

a) If both item A: $\lambda \cdot B$ (P1) $\beta$ and item C: $\delta \cdot B$ (P2) $\gamma$ belong to the closure function CLOSURE ($I_j$), two new item sets are generated with item A: $\lambda B$ (P1)$\cdot \beta$ and item C: $\delta$ B (P2)$\cdot \gamma$ as kernels respectively;

b) Else if both item A: $\lambda \cdot B$ $\beta$ and item C: $\delta \cdot B$ (P2) $\gamma$ belong to CLOSURE ($I_j$) two new item sets are generated with item A: $\lambda B \cdot \beta$ and item C: $\delta$ B (P2)$\cdot \gamma$ as kernels respectively;

c) Else if both item A: $\lambda \cdot B$ $\beta$ and item C: $\delta \cdot B$ $\gamma$ belong to CLOSURE ($I_j$) while reducible item B: $\sigma \cdot$ belongs to item set I, and furthermore, if item A: $\lambda \cdot B$ $\beta$ and item B: $\sigma \cdot$ are congenetic items while item C: $\delta \cdot B$ $\gamma$ and item B: $\sigma \cdot$ are noncongenetic items (or item A: $\lambda \cdot B$ $\beta$ and item B: $\sigma \cdot$ are noncongenetic items while item C: $\delta \cdot B$ $\gamma$ and item B: $\sigma \cdot$ are congenetic items), two new item sets are generated with item A: $\lambda$ B$\cdot \beta$ and item C: $\delta$B$\cdot \gamma$ as kernels respectively; otherwise a new item set is generated with item A: $\lambda$B$\cdot \beta$ and item C: $\delta$B$\cdot \gamma$ as kernels.

d) Else if item A: $\lambda \cdot B$ (P1)$\cdot \beta$ belongs to CLOSURE ($I_j$), a new item set is generated with item A: $\lambda B$ (P1)$\cdot \beta$ as a kernel.

e) Else if item A: $\lambda \cdot B$ $\beta$ belongs to CLOSURE ($I_j$), a new item set is generated with item A: $\lambda$ B$\cdot \beta$ as a kernel.

Figure 7:
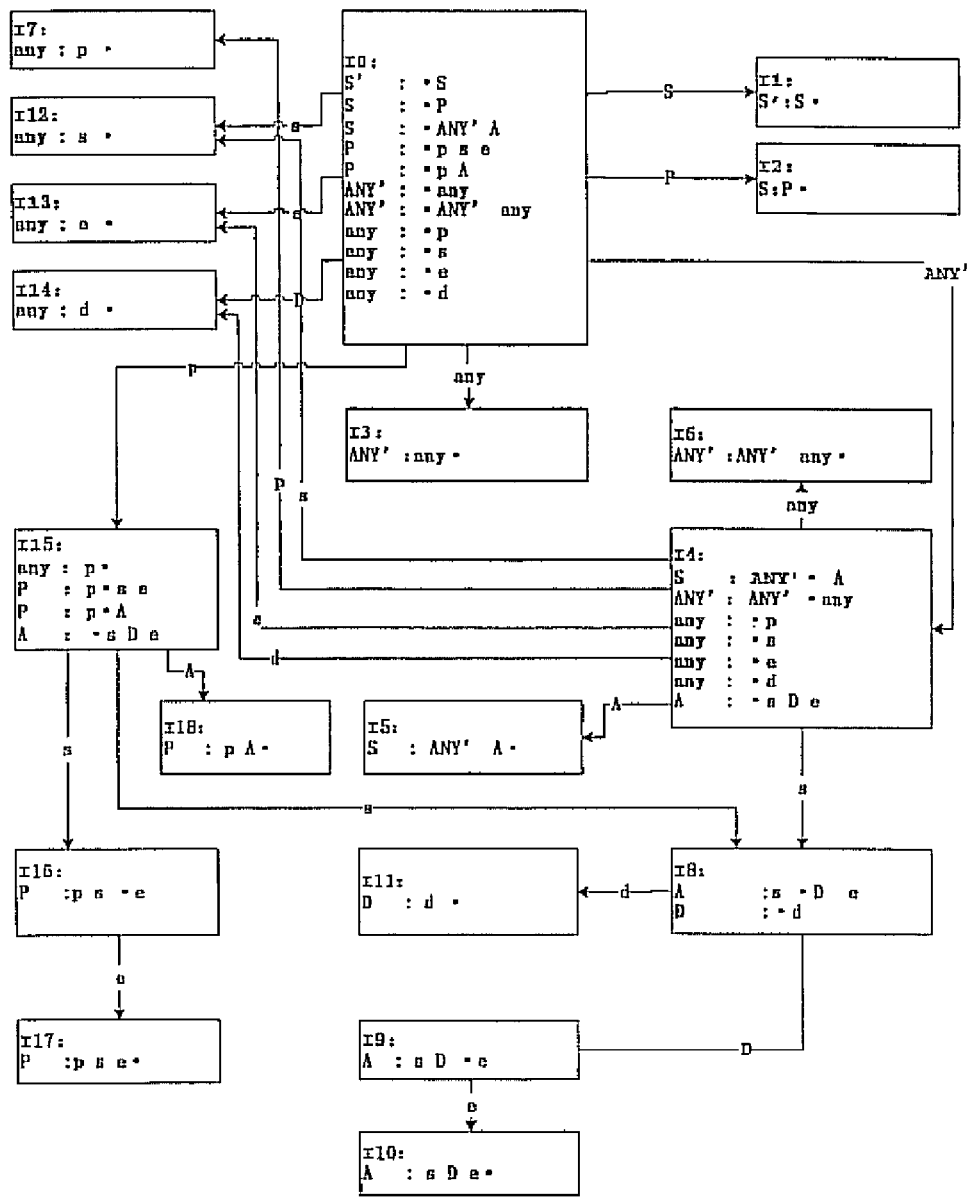
FIG. 7 illustrates a constitution diagram of items sets obtained with an improved algorithm according to an embodiment of the present invention.

Utilizing the item sets of the extended grammar G2' generated with the improved algorithm (see FIG. 7), supposing the actual inputs are still p, s, d and e, the parallel matching process of the controller is as follows (see Table 4).

TABLE 4

Parallel matching process of extended grammar G2'
(which solves the defunct stack problem)

| Step | Input event | State stack | | | Action | ACTION | GOTO |
|---|---|---|---|---|---|---|---|
| 1 | p | 0 | | | Shift | S15 | |
| 2 | | 0 | 15 | | Reduce any: p | | |
| 3 | any | 0 | 15 | | Shift | | 3 |
| | | 0 | | | | | |
| 4 | | 0 | 15 | | Reduce ANY': any | | |
| | | 0 | 3 | | | | |
| 5 | ANY' | 0 | 15 | | Shift | | 4 |
| | | 0 | | | | | |
| 6 | | 0 | 15 | | | | |
| | | 0 | 4 | | | | |
| 7 | s | 0 | 15 | | Shift | S16 | |
| | s | 0 | 4 | | Shift | S8 | |
| 8 | | 0 | 15 | 16 | Reduce any: s | | |
| | | 0 | 15 | 8 | | | |
| | | 0 | 4 | ↵ | | | |
| | | 0 | 4 | 12 | | | |
| 9 | any | 0 | 15 | 16 | Shift | | 6 |
| | | 0 | 15 | 8 | | | |
| | | 0 | 4 | ↵ | | | |
| | | 0 | 4 | | | | |
| 10 | | 0 | 15 | 16 | Reduce ANY': ANY' any | | |
| | | 0 | 15 | 8 | | | |
| | | 0 | 4 | ↵ | | | |
| | | 0 | 4 | 6 | | | |
| 11 | ANY' | 0 | 15 | 16 | Shift | | 4 |
| | | 0 | 15 | 8 | | | |
| | | 0 | 4 | ↵ | | | |
| | | 0 | | | | | |
| 12 | | 0 | 15 | 16 | | | |
| | | 0 | 15 | 8 | | | |
| | | 0 | 4 | ↵ | | | |
| | | 0 | 4 | | | | |
| 13 | d | 0 | 15 | 16 | Error | | |
| | d | 0 | 15 | 8 | Shift | S11 | |
| | d | 0 | 4 | ↵ | Shift | S11 | |
| | d | 0 | 4 | | Shift | S14 | |
| 14 | | 0 | 15 | 8 | 11 | Reduce D: d | |
| | | 0 | 4 | ↵ | | | |
| | | 0 | 4 | 14 | | Reduce any: d | |
| 15 | D | 0 | 15 | 8 | 11 | Shift | 9 |
| | | 0 | 4 | ↵ | | | |
| | any | 0 | 4 | | | Shift | 6 |
| 16 | | 0 | 15 | 8 | 9 | Reduce ANY': ANY' any | |
| | | 0 | 4 | ↵ | | | |
| | | 0 | 4 | 6 | | | |
| 17 | ANY' | 0 | 15 | 8 | 9 | Shift | 4 |
| | | 0 | 4 | ↵ | | | |
| | | 0 | | | | | |
| 18 | | 0 | 15 | 8 | 9 | | |
| | | 0 | 4 | ↵ | | | |
| | | 0 | 4 | | | | |

TABLE 4-continued

Parallel matching process of extended grammar G2'
(which solves the defunct stack problem)

| Step | Input event | State stack | | | | Action | ACTION | GOTO |
|---|---|---|---|---|---|---|---|---|
| 19 | e | 0 | 15 | 8 | 9 | Shift | S10 | |
|  |  | 0 | 4 | ⊥ |  |  |  |  |
|  | e | 0 | 4 |  |  |  | S13 | |
| 20 |  | 0 | 15 | 8 | 9 10 | Reduce A: sDe |  |  |
|  |  | 0 | 4 | ⊥ |  |  |  |  |
|  |  | 0 | 4 | 13 |  | Reduce any: e |  |  |
| 21 | A | 0 | 15 |  |  | Shift |  | 18 |
|  | A | 0 | 4 |  |  | Shift |  | 5 |
|  | any | 0 | 4 |  |  | Shift |  | 6 |
| 22 |  | 0 | 15 | 18 |  | Reduce P: pA |  |  |
|  |  | 0 | 4 | 5 |  | Reduce S: ANY' A |  |  |
|  |  | 0 | 4 | 6 |  | Reduce ANY': ANY' any |  |  |
| 23 | P | 0 |  |  |  | Shift |  | 2 |
|  | S | 0 |  |  |  | Shift |  | 1 |
|  | ANY' | 0 |  |  |  | Shift |  | 4 |
| 24 |  | 0 | 2 |  |  | Reduce S: P |  |  |
|  |  | 0 | 1 |  |  | Reduce S': S |  |  |
|  |  | 0 | 4 |  |  |  |  |  |
| 25 | S | 0 |  |  |  | Shift |  | 1 |
|  | S' | 0 |  |  |  | Succ |  |  |
|  |  | 0 | 4 |  |  |  |  |  |
| 26 |  | 0 | 1 |  |  | Reduce S': S |  |  |
|  |  | 0 |  |  |  | Succ |  |  |
|  |  | 0 | 4 |  |  |  |  |  |
| 27 | S' | 0 |  |  |  | Succ |  |  |
|  |  | 0 |  |  |  | Succ |  |  |
|  |  | 0 | 4 |  |  |  |  |  |

It is seen from the above table that, with the improved neighbor item set generation algorithm, the merge-delay problem is solved.

Figure 8:
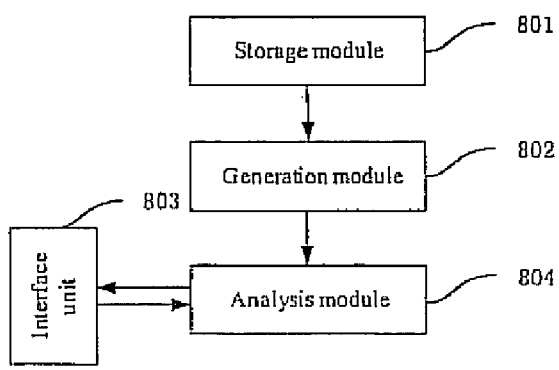
FIG. 8 illustrates a constitution diagram of an event detection device according to an embodiment of the present invention.

FIG. 8 shows an event detection device according to an embodiment of the present invention. The event detection device includes modules as follows.

A storage module 801 is adapted to store event-based detection rules. Those rules are predefined in a predicative context-free grammar.

A generation module 802 is adapted to parse the detection rules and generate a corresponding parsing table of a pushdown automaton. The parsing table supports parallel parsing.

An interface unit 803 is adapted to receive events to be detected and output detection results.

An analysis module 804 is adapted to perform a matching in the parsing table for the events to be detected, to obtain the detection results.

Preferably, when the detection device is applied to network intrusion detection field, the detection rules further include protocol rules and attack rules. Additionally, the generation module can include the parts as follows.

A parser is adapted to parse the protocol rules and attack rules to obtain a syntax tree.

A first converter is adapted to generate the item sets of the predicative context-free grammar with a predicative LR(0) generation algorithm.

A second converter is adapted to convert the item sets to obtain a corresponding pushdown automaton parsing table which includes an ACTION table and a GOTO table.

Preferably, the predicative LR(0) generation algorithm includes the steps of: a) generating an initial item set with a predicative item set closure algorithm; b) on the basis of the initial item set, generating neighbor item sets with a predicative neighbor item set generation algorithm; c) on the basis of the neighbor item sets, executing the predicative item set closure algorithm and the neighbor item set generation algorithm iteratively until no new item set is generated.

The neighbor item set generation algorithm of the item set I may typically include the steps as follows.

a) If both item A: $\lambda \cdot B$ (P1) $\beta$ and item C: $\delta \cdot B$ (P2) $\gamma$ belong to the closure function CLOSURE (I), two new item sets are generated with item A: $\lambda$ B (P1)·$\beta$ and item C: $\delta$ B (P2)·$\gamma$ as kernels respectively.

b) Else if both item A: $\lambda \cdot B$ $\beta$ and item C: $\delta \cdot B$ (P2) $\gamma$ belong to CLOSURE (I), two new item sets are generated with item A: $\lambda$ B·$\beta$ and item C: $\delta$ B (P2)·$\gamma$ as kernels respectively.

c) Else if both item A: $\lambda \cdot B$ $\beta$ and item C: $\delta$ B$\gamma$ belong to CLOSURE (I), two new item sets are generated with item A: $\lambda$ B·$\beta$ and item C: $\delta$ B·$\gamma$ as kernels respectively.

d) Else if item A: $\lambda \cdot B$ (P1) $\beta$ belongs to CLOSURE (I), a new item set is generated with item A: $\lambda$ B (P1)·$\beta$ as a kernel.

e) Else if item A: $\lambda \cdot B$ $\beta$ belongs to CLOSURE (I), a new item set is generated with item A: $\lambda$ B·$\beta$ as a kernel.

Preferably, when the item set I includes multiple root item sets and there are an item in the root item set $I_j$ that is a noncongenetic item of the item set I, a neighbor item set generation algorithm to be applied to the root item set $I_j$ includes the steps as follows.

a) If both item A: $\lambda \cdot B$ (P1) $\beta$ and item C: $\delta \cdot B$ (P2) $\gamma$ belong to the closure function CLOSURE ($I_j$), two new item sets are generated with item A: $\lambda$ B (P1)·$\beta$ and item C: $\delta$ B (P1)·$\gamma$ as kernels respectively, b) Else if both item A: $\lambda \cdot B$ $\beta$ and item C: $\delta \cdot B$ (P2) $\gamma$ belong to CLOSURE ($I_j$), two new item sets are generated with item A: $\lambda$ B·$\beta$ and item C: $\delta$ B (P2)·$\gamma$ as kernels respectively.

c) Else if both item A: $\lambda \cdot B \cdot \beta$ and item C: $\delta \cdot B \cdot \gamma$ belong to CLOSURE ($I_j$) while reducible item B: $\sigma \cdot$ belongs to item set I, and furthermore, if item A: $\lambda \cdot B \cdot \beta$ and item B: $\sigma \cdot$ are congenetic items while item C: $\delta \cdot B$ $\gamma$ and item B: $\sigma \cdot$ are noncongenetic items (or item A: $\lambda \cdot B$ $\beta$ and item B: $\sigma \cdot$ are noncongenetic items while item C: $\delta \cdot B$ $\gamma$ and item B: $\sigma \cdot$ are congenetic items), two new item sets are generated with item A: λ B·β and item C: δB·γ as kernels respectively; otherwise a new item set is generated with item A: λB·β and item C: δB·γ as kernels.

d) Else if item A: λ·B (P1)·β belongs to CLOSURE ($I_j$), a new item set is generated with item A: λB (P1)·β as a kernel.

e) Else if item A: λ·B β belongs to CLOSURE ($I_j$), a new item set is generated with item A: λB·β as a kernel.

Preferably, the algorithm of the controller is as follows.

a) If an input symbol is a terminal symbol, a parsing table entry is taken from the ACTION table. If the input symbol is a non-terminal symbol, a parsing table entry is taken from the GOTO table.

b) If the parsing table entry contains a Shift-Reduce (SR) conflict or a Reduce-Reduce (RR) conflict, it is required to copy the state stack so that each state stack has only one action, and then the process goes to step c).

c) If the parsing table entry is a reduction action $I_j$, a reduction is performed with the production j, the pointers of the state stack and the symbol stack each are subtracted by m which is a number of events on the right-hand side of the production j, and then the non-terminal symbol on the right-hand side of the production j is taken as an input symbol. If there is a merged state stack, the merged state stack is split, and then the process returns to step a); else if the parsing table entry is not a reduction action, the process goes to step d).

d) For input symbol A:

1) besides the symbol a with a corresponding parsing table entry as Shift action $S_0$, if there is at least one predicative symbol, supposing which is $a(p_1)$, $a(p_2)$, ..., $a(p_k)$ with corresponding parsing table entries as Shift actions $S_1$, $S_2$, ..., $S_k$, whether predicates $p_1$, $p_2$, ..., $p_k$ are true is checked. If at least one of the predicates is true, which means a Shift-Shift (SS) conflict occurs, the state stack is copied and the symbol a and the symbol $a(p_i)$ that meets the predicate $p_i$ are taken as the input symbols. Then the process goes to step e);

2) if the parsing table entry corresponding to the symbol a is blank, and there are at least two predicative symbols, supposing which are $a(p_1)$, $a(p_2)$, ..., $a(p_k)$ with corresponding parsing table entries as Shift actions $S_1$, $S_2$, ..., $S_k$, whether predicates $p_1$, $p_2$, ..., $p_k$ are true is checked. If at least two of the predicates are true, which means a Shift-Shift (SS) conflict occurs, the state stack is copied, and the symbols $a(p_i)$ which meet the predicates $p_i$ are taken as the input symbols. Then the process goes to step e).

e) Else if the parsing table entry is a Shift action $S_j$, the input symbol is shifted into the symbol stack and the state j is shifted into the state stack. If there is another state stack with the same stack top state j, the two state stacks are merged. Furthermore, if parsing table entry ACTION [j]=$r_i$, that is, the state j is a reducible state, a reduction is performed with the production i. If there is a merged state stack, a split is performed on the stack. Then the process returns to step a). If the state j is not a reducible state, the process of the algorithm terminates.

f) Else if the parsing table entry is a successful action Succ, which means the grammar analysis is successful, the process of the algorithm terminates.

g) Else if the parsing table entry is blank, the process of the algorithm goes to the error handling and terminates.

The above detection device, as a combination of program modules, can also be stored in a computer readable media as a computer program product. Therefore, the present invention also claims a computer program product including a computer readable media. Computer executable codes, which are adapted to execute the aforementioned detection schemes, are stored in the readable media.

A detailed introduction of an event detection method and device provided by the present invention is given above. Specific individual cases are used in the specification to describe the principles and implementation modes of the present invention. The description of the above embodiments is only used to aid in understanding the method and core idea thereof; also, those skilled in the art may make modifications to the embodiments and the application scope in light of the concept of the present invention, without departing from the scope of the present invention. In summary, the content of this specification should not be understood as limitations for the present invention.

What is claimed is:

1. An event detection method, comprising:
predefining event-based detection rules with a predicative context-free grammar, wherein the predicative context-free grammar G is a quintuple in a form of G={$V_N$, $V_T$, S, R, P}, in which: $V_T$ is a terminal symbol set, comprising terminal symbols $v_t$; $V_N$ is a non-terminal symbol set, comprising non-terminal symbols $v_n$; $V_T$ and $V_N$ are collectively referred to as a symbol set V in which an item is referred to as a symbol v; S is a target grammar symbol, with S∈$V_N$; R is a production set of the grammar; and P is a predicate set of the grammar, and wherein the production is in a form of $v_n$: $v_1(p_1)$, ..., $v_k(p_k)$, in which on a left-hand side of the production is a non-terminal symbol $v_n$∈$V_N$; on a right-hand side of the production comprises zero or more predicative terminal symbols or predicative non-terminal symbols $v_1$, ..., $v_k$∈V; predicates $p_1$, ..., $p_k$∈P are constraints that are to be met by the symbols on the right-hand side of the production and consist of a combination of logical operators, arithmetic operators and function calls; and semantics of the production is that the symbol on the left-hand side of the production is resolved from the predicative symbols on the right-hand side of the production;

generating through a generation module, by parsing the detection rules, a parsing table of pushdown automaton which supports parallel parsing, wherein the parsing table of pushdown automaton is obtained through the steps of: a) parsing protocol rules and attack rules to obtain a syntax tree; b) generating item sets of the predicative context-free grammar with a predicative LR(0) generation algorithm; and c) converting the item sets to obtain a corresponding parsing table of pushdown automaton which comprises an ACTION table and a GOTO table;

receiving through an interface unit an event to be detected; and analyzing by a controller the event to be detected according to the parsing table, to obtain a detection result.

2. The method according to claim 1, wherein the detection rules comprise protocol rules and attack rules when the method is applied to network intrusion detection field.

3. The method according to claim 2, further comprising: defining multiple protocol events on different layers with predicates, and defining the attack rules on the basis of atomic protocol events and/or abstracted protocol events.

4. The method according to claim 3, wherein the step of analyzing comprises:
buffering a matching state of a previous event to be detected; and analyzing a next event to be detected in the parsing table with reference to the matching state of the previous event to be detected, to obtain a latest matching state of the next event to be detected.

5. The method according to claim 2, wherein the predefining of the protocol rules and the attack rules is performed through the steps of:
   on the basis of a protocol specification, adding a protocol terminal symbol $v_{tp}$ to the terminal symbol set $V_T$ with the predicative context-free grammar;
   adding an attack non-terminal symbol $v_{na}$ to the non-terminal symbol set $V_N$ with the predicative context-free grammar; and
   adding a production $r_a$ to the production set R, with the attack non-terminal symbol $v_{na}$ on a left-hand side of the production $r_a$ and at least one protocol terminal symbol $v_{tp}$ on a right-hand side of the production $r_a$.

6. The method according to claim 2, wherein the protocol rules and the attack rules are predefined through the steps of:
   on the basis of a protocol specification, adding a protocol terminal symbol $v_{tp}$ to the terminal symbol set $V_T$ with the predicative context-free grammar;
   adding a protocol non-terminal symbol $v_{np}$ to the non-terminal symbol set $V_N$, wherein the protocol non-terminal symbol $v_{np}$ is obtained from a combination of the protocol terminal symbol $v_{tp}$ and a predicate;
   adding an attack non-terminal symbol $v_{na}$ to the non-terminal symbol set $V_N$ with the predicative context-free grammar; and
   adding a production $r_a$ to the production set R, with the attack non-terminal symbol $v_{na}$ on a left-hand side of the production $r_a$ and at least one protocol terminal symbol $v_{tp}$ or protocol non-terminal symbol $v_{np}$ on a right-hand side of the production $r_a$.

7. The method according to claim 2, wherein the predicative LR(0) generation algorithm comprises the steps of:
   a. generating an initial item set with a predicative item set closure algorithm;
   b. on the basis of the initial item set, generating neighbor item sets with a predicative neighbor item set generation algorithm; and
   c. on the basis of the neighbor item sets, executing the predicative item set closure algorithm and the neighbor item set generation algorithm iteratively until no new item set is generated.

8. The method according to claim 7, wherein for an item set I, the neighbor item set generation algorithm comprises:
   a) if both item A: $\lambda \cdot B$ (P1) $\beta$ and item C: $\delta \cdot B$ (P2) $\gamma$ belong to a closure function CLOSURE (I), generating two new item sets with item A: $\lambda$ B (P1)$\cdot \beta$ and item C: $\delta$ B(P2) $\cdot \gamma$ as kernels respectively;
   b) else if both item A: $\lambda \cdot B$ $\beta$ and item C: $\delta \cdot B$ (P2) $\gamma$ belong to the CLOSURE (I), generating two new item sets with item A: $\lambda$ B$\cdot \beta$ and item C: $\delta$ B (P2)$\cdot \gamma$ as kernels respectively;
   c) else if both item A: $\lambda \cdot B\beta$ and item C: $\delta \cdot B\gamma$ belong to the CLOSURE (I), generating a new item set with item A: $\lambda B\cdot \beta$ and item C: $\delta B \cdot \gamma$ as kernels;
   d) else if item A: $\lambda \cdot B$ (P1) $\beta$ belongs to the CLOSURE (I), generating a new item set with item A: $\lambda$ B (P1) $\cdot \beta$ as a kernel; and
   e) else if item A: $\lambda \cdot B$ $\beta$ belongs to the CLOSURE (I), generating a new item set with item A: $\lambda$ B$\cdot \beta$ as a kernel.

9. The method according to claim 7, wherein when the item set I comprises multiple root item sets and there is an item in an item set $I_j$ that is a noncongenetic item of the item set I, a neighbor item set generation algorithm to be applied to the root item set $I_j$ comprises:
   a) if both item A: $\lambda \cdot B$ (P1) $\beta$ and item C: $\delta \cdot B$ (P2) $\gamma$ belong to a closure function CLOSURE ($I_j$), generating two new item sets with item A: $\lambda$ B (P1)$\cdot \beta$ and item C: $\delta$ B (P2)$\cdot \gamma$ as kernels respectively;
   b) else if both item A: $\lambda \cdot B$ $\beta$ and item C: $\delta \cdot B$ (P2) $\gamma$ belong to the CLOSURE ($I_j$), generating two new item sets with item A: $\lambda$ B$\cdot \beta$ and item C: $\delta$ B (P2)$\cdot \gamma$ as kernels respectively;
   c) else if both item A: $\lambda \cdot B$ $\beta$ and item C: $\delta \cdot B$ $\gamma$ belong to the CLOSURE ($I_j$) while reducible item B: $\sigma \cdot$ belongs to item set I, and furthermore, if item A: $\lambda \cdot B$ $\beta$ and item B: $\sigma \cdot$ are congenetic while item C: $\delta \cdot B$ $\gamma$ and item B: $\sigma \cdot$ are not congenetic or item A: $\lambda \cdot B$ $\beta$ (and item B: $\sigma \cdot$ are not congenetic while item C: $\delta \cdot B$ $\gamma$ and item B: $\sigma \cdot$ are congenetic, generating two new item sets with item A: $\lambda B \cdot \beta$ and item C: $\delta B \cdot \gamma$ as kernels respectively; otherwise generating a new item set with item A: $\lambda \cdot B \cdot \beta$ and item C: $\delta B \cdot \gamma$ as kernels;
   d) else if item A: $\lambda \cdot B$ (P1)$\cdot \beta$ belongs to the CLOSURE ($I_j$), generating a new item set with item A: $\lambda$ B (P1)$\cdot \beta$ as a kernel; and
   e) else if item A: $\lambda \cdot B$ $\beta$ belongs to the CLOSURE ($I_j$), generating a new item set with item A: $\lambda B \cdot \beta$ as a kernel.

10. The method according to claim 2, wherein the parsing table reserves a Shift-Shift (SS) conflict, a Shift-Reduce (SR) conflict and a Reduce-Reduce (RR) conflict.

11. The method according to claim 2, wherein the parsing table of pushdown automaton comprises an ACTION table and a GOTO table; and an algorithm of the controller comprises the steps of:
   a) if an input symbol is a terminal symbol, taking an parsing table entry from the ACTION table; if the input symbol is a non-terminal symbol, taking an parsing table entry from the GOTO table;
   b) if the parsing table entry contains a Shift-Reduce (SR) conflict or a Reduce-Reduce (RR) conflict, copying a state stack so that each state stack has only one action, and then proceeding to step c);
   c) if the parsing table entry is a reduction action $r_j$, reducing with a production j, subtracting pointers of the state stack and a symbol stack by m which is a number of events on a right-hand side of the production j, and then taking a non-terminal symbol on the right-hand side of the production j as an input symbol; if there is a merged state stack, splitting the merged state stack and then returning to step a); else if the parsing table entry is not a reduction action, proceeding to step d);
   d) for an input symbol a,
   besides the symbol a with a corresponding parsing table entry as a Shift action $S_0$, if there is at least one predicative symbol, supposing which is $a(p_1)$, $a(p_2)$, ..., $a(p_k)$ with corresponding parsing table entries as Shift actions $S_1$, $S_2$, ..., $S_k$, checking whether predicates $p_1$, $p_2$, ..., $p_k$ are true; if at least one of the predicates is true, which means a Shift-Shift conflict occurs, copying the state stack, taking the symbol a and a symbol $a(p_i)$ which meets the predicate $p_i$ as input symbols, and then proceeding to step e); and
   if the parsing table entry corresponding to the symbol a is blank, and there are at least two predicative symbols, supposing which are $a(p_1)$, $a(p_2)$, ..., $a(p_k)$ with corresponding parsing table entries as Shift actions $S_1$, $S_2$, ..., $S_k$, checking whether predicates $p_1$, $p_2$, ..., $p_k$ are true; if at least two of the predicates are true, which means a Shift-Shift conflict occurs, copying the state stack, taking symbols $a(p_i)$ which meet the predicates $p_i$ as input symbols, and then proceeding to step e);

e) else if the parsing table entry is a Shift action $S_j$, shifting the input symbol into the symbol stack and state j into the state stack; if there another state stack with the same stack top state j, merging the two state stacks; furthermore, if a parsing table entry ACTION [j]=$r_i$, that is, the state j is a reducible state, performing a reduction with the production i; if there is a merged state stack, splitting the merged state stack; then returning to step a); if the state j is not a reducible state, terminating the process of the algorithm;

f) else if the parsing table entry is a successful action Succ, which means the grammar analysis is successful, terminating the process of the algorithm; and g) else if the parsing table entry is blank, proceeding to an error handing and terminating the process of the algorithm.

12. A computer program product, comprising a non-transitory computer readable medium embodying a computer readable program for operating on a computer to detect an event, said program comprising instructions that cause the computer to perform the steps of:

predefining event-based detection rules with a predicative context-free grammar, wherein the predicative context-free grammar G is a quintuple in a form of G={$V_N$, $V_T$, S, R, P}, in which: $V_T$ is a terminal symbol set, comprising terminal symbols $v_t$; $V_N$ is a non-terminal symbol set, comprising non-terminal symbols $v_n$; $V_T$ and $V_N$ are collectively referred to as a symbol set V in which an item is referred to as a symbol v; S is a target grammar symbol, with S∈$V_N$; R is a production set of the grammar; and P is a predicate set of the grammar, and wherein the production is in a form of $v_n$: $v_1(p_1), \ldots, v_k(p_k)$, in which: on a left-hand side of the production is a non-terminal symbol $v_n$∈$V_N$; on a right-hand side of the production comprises zero or more predicative terminal symbols or predicative non-terminal symbols $v_1, \ldots, v_k$∈V; predicates $p_1, \ldots, p_k$∈P are constraints that are to be met by the symbols on the right-hand side of the production, and consist of a combination of logical operators, arithmetic operators and function calls; and semantics of the production is that the symbol on the left-hand side of the production is resolved from the predicative symbols on the right-hand side of the production;

generating through a generation module, by parsing the detection rules, a parsing table of pushdown automaton which supports parallel parsing, wherein the parsing table of pushdown automaton is obtained through the steps of: a) parsing protocol rules and attack rules to obtain a syntax tree; b) generating item sets of the predicative context-free grammar with a predicative LR(0) generation algorithm; and c) converting the item sets to obtain a corresponding parsing table of pushdown automaton which comprises an ACTION table and a GOTO table;

receiving through an interface unit an event to be detected; and analyzing by a controller the event to be detected according to the parsing table to obtain a detection result.

* * * * *